(12) United States Patent
Misumi et al.

(10) Patent No.: US 9,995,398 B2
(45) Date of Patent: Jun. 12, 2018

(54) DOUBLE ECCENTRIC VALVE

(71) Applicant: AISAN KOGYO KABUSHIKI KAISHA, Obu-shi, Aichi (JP)

(72) Inventors: Hiroshi Misumi, Chita (JP); Sunao Kitamura, Nagoya (JP)

(73) Assignee: AISAN KOGYO KABUSHIKI KAISHA, Obu-Shi (JP)

( * ) Notice: Subject to any disclaimer, the term of this patent is extended or adjusted under 35 U.S.C. 154(b) by 6 days.

(21) Appl. No.: 15/038,102

(22) PCT Filed: Dec. 24, 2014

(86) PCT No.: PCT/JP2014/084125
§ 371 (c)(1),
(2) Date: May 20, 2016

(87) PCT Pub. No.: WO2015/098952
PCT Pub. Date: Jul. 2, 2015

(65) Prior Publication Data
US 2016/0290514 A1    Oct. 6, 2016

(30) Foreign Application Priority Data
Dec. 25, 2013  (JP) .................. 2013-267944

(51) Int. Cl.
*F16K 1/22*  (2006.01)
*F02D 9/10*  (2006.01)
(Continued)

(52) U.S. Cl.
CPC ............ *F16K 1/222* (2013.01); *B23P 15/001* (2013.01); *F02D 9/1015* (2013.01);
(Continued)

(58) Field of Classification Search
CPC ... F16K 1/221; F16K 1/22; F16K 1/18; F16K 1/20; F16K 1/2007; F16K 1/24;
(Continued)

(56) References Cited

U.S. PATENT DOCUMENTS 2,673,061 A * 3/1954 Broz .................... F16K 1/24
                                                           251/163
2,742,255 A    4/1956 Sealey
(Continued)

FOREIGN PATENT DOCUMENTS

CN   103438226 A    12/2013
DE   19959109 A1 *  7/2001   ........... F16K 1/2266
(Continued)

OTHER PUBLICATIONS

Jun. 28, 2016 International Preliminary Report on Patentability issued in International Patent Application No. PCT/JP2014/084128.
(Continued)

*Primary Examiner* — Reinaldo Sanchez-Medina
*Assistant Examiner* — David Colon Morales
(74) *Attorney, Agent, or Firm* — Oliff PLC

(57) ABSTRACT

A double eccentric valve includes a valve seat having a seat surface, a valve element having an annular sealing surface, and a rotary shaft having an axis parallel to a radial direction of the valve element and offset from the center of a valve hole in a radial direction thereof. The sealing surface is positioned eccentrically from the axis toward an extending direction of an axis of the valve element. The valve element rotates about the axis of the rotary shaft between a fully-closed position in which the sealing surface is in surface contact with the seat surface and a fully-open position in which the sealing surface is furthest away from the seat surface. Simultaneously with start of rotation of the valve element from the fully-closed position, the sealing surface (Continued)

starts to separate from the seat surface and also move along rotation path about the axis of the rotary shaft.

14 Claims, 30 Drawing Sheets

(51) Int. Cl.
| | |
|---|---|
| B23P 15/00 | (2006.01) |
| F16K 1/20 | (2006.01) |
| F02M 26/70 | (2016.01) |
| F02M 26/00 | (2016.01) |
| F02M 26/54 | (2016.01) |
| F02M 26/48 | (2016.01) |
| F16K 31/04 | (2006.01) |
| F16K 1/24 | (2006.01) |

(52) U.S. Cl.
CPC ............ *F02D 9/1025* (2013.01); *F02M 26/00* (2016.02); *F02M 26/48* (2016.02); *F02M 26/54* (2016.02); *F02M 26/70* (2016.02); *F16K 1/20* (2013.01); *F16K 1/2007* (2013.01); *F16K 1/2014* (2013.01); *F16K 1/221* (2013.01); *F16K 1/24* (2013.01); *F16K 31/041* (2013.01)

(58) Field of Classification Search
CPC ........ F02M 26/00; F02M 26/48; F02M 26/54; F02M 26/70; B23P 15/001; F02D 9/1015; F02D 9/1025
USPC .......................... 251/192, 305, 308
See application file for complete search history.

(56) References Cited

U.S. PATENT DOCUMENTS

| | | | | | |
|---|---|---|---|---|---|
| 3,343,805 | A | * | 9/1967 | Felton | F16K 1/22 251/306 |
| 3,623,696 | A | | 11/1971 | Baumann | |
| 3,675,894 | A | * | 7/1972 | Friedell | F16K 5/204 251/163 |
| 3,809,361 | A | * | 5/1974 | Pfundstein | F16K 1/226 251/162 |
| 3,931,955 | A | * | 1/1976 | Jacobs | F16K 1/226 251/173 |
| 4,073,470 | A | * | 2/1978 | Harris | F16K 1/24 251/161 |
| 4,133,512 | A | * | 1/1979 | Johnson | F16K 1/2285 251/173 |
| 4,265,426 | A | * | 5/1981 | Thurston | F16K 1/2263 251/306 |
| 4,281,817 | A | * | 8/1981 | Adams | F16K 1/2263 251/305 |
| 4,284,264 | A | * | 8/1981 | Hubertson | F16K 1/2263 251/305 |
| 4,296,915 | A | * | 10/1981 | Baumann | F16K 1/2266 251/174 |
| 4,313,592 | A | * | 2/1982 | Baas | F16K 1/24 251/162 |
| 4,407,483 | A | * | 10/1983 | Gachot | F16K 1/222 251/287 |
| 4,436,281 | A | * | 3/1984 | Chiron | F16K 1/226 251/305 |
| 4,480,815 | A | * | 11/1984 | Kreij | F16K 1/222 251/298 |
| 4,489,917 | A | * | 12/1984 | Baumann | F16K 1/222 251/305 |
| 4,601,459 | A | * | 7/1986 | Verdelet | F16K 1/226 251/305 |
| 4,770,392 | A | | 9/1988 | Schmidt | |
| 4,770,393 | A | * | 9/1988 | Hubertson | F16K 1/2263 251/305 |
| 4,921,212 | A | * | 5/1990 | deQuay | F16K 1/24 251/160 |
| 5,125,624 | A | | 6/1992 | Yohner | |
| 5,158,265 | A | * | 10/1992 | Miyairi | F16K 1/222 251/305 |
| 5,193,572 | A | * | 3/1993 | Le Devehat | F16L 55/46 137/244 |
| 5,275,375 | A | | 1/1994 | Semence | |
| 5,330,157 | A | * | 7/1994 | Dern | F16K 1/24 251/162 |
| 5,707,040 | A | * | 1/1998 | Gasaway | F16K 1/2263 251/305 |
| 5,713,556 | A | * | 2/1998 | Yokota | F16K 1/24 251/228 |
| 5,947,445 | A | * | 9/1999 | Wang | F16K 1/2263 251/173 |
| 5,957,428 | A | * | 9/1999 | Yokota | F16K 1/24 251/304 |
| 6,029,949 | A | * | 2/2000 | Brown | F16K 1/24 251/305 |
| 6,135,415 | A | | 10/2000 | Kloda et al. | |
| 6,149,130 | A | * | 11/2000 | Thurston | F16K 1/22 137/557 |
| 6,193,214 | B1 | * | 2/2001 | Schatz | F02D 9/06 123/323 |
| 6,328,281 | B1 | * | 12/2001 | Jung | F02D 9/10 251/305 |
| 6,589,380 | B2 | * | 7/2003 | Gnage | B29C 65/1635 156/272.8 |
| 6,702,257 | B1 | * | 3/2004 | Mollmann | F16K 1/222 251/305 |
| 6,739,579 | B1 | * | 5/2004 | Rim | F01N 3/0842 251/306 |
| 7,011,298 | B2 | * | 3/2006 | Gerhardy | F02D 9/1045 123/73 PP |
| 7,172,174 | B2 | * | 2/2007 | Sano | B29C 65/1635 219/121.64 |
| 7,546,828 | B2 | * | 6/2009 | Kuhnel | B29C 45/0017 123/305 |
| 7,669,581 | B2 | * | 3/2010 | Sasaki | F02D 9/04 123/399 |
| 7,789,372 | B2 | * | 9/2010 | Fornara | F02B 31/06 123/337 |
| 8,201,401 | B2 | * | 6/2012 | Abram | F01N 1/166 137/115.16 |
| 2007/0063163 | A1 | * | 3/2007 | Yeary | F16K 1/22 251/305 |
| 2007/0240690 | A1 | * | 10/2007 | Nanba | F16K 31/041 123/568.18 |
| 2011/0073789 | A1 | * | 3/2011 | Yeary | F16K 1/222 251/118 |
| 2011/0272613 | A1 | * | 11/2011 | Watanuki | F16K 1/226 251/314 |
| 2012/0061603 | A1 | | 3/2012 | Kurihara et al. | |
| 2012/0181468 | A1 | * | 7/2012 | Telep | F01M 13/0011 251/304 |
| 2013/0068981 | A1 | | 3/2013 | Hotta et al. | |
| 2013/0153803 | A1 | * | 6/2013 | Adenot | F02D 9/1015 251/298 |
| 2013/0153804 | A1 | * | 6/2013 | Adenot | F02D 9/1025 251/305 |
| 2013/0248748 | A1 | * | 9/2013 | Baumann | F16K 1/2057 251/305 |

FOREIGN PATENT DOCUMENTS

| | | | | |
|---|---|---|---|---|
| EP | 0029110 A1 | * | 5/1981 | ............ F16K 1/22 |
| EP | 0 493 921 A1 | | 7/1992 | |
| GB | 1433918 A | * | 4/1976 | ............ F16K 1/221 |
| JP | S58-138865 U | | 9/1983 | |
| JP | H05-25075 U | | 4/1993 | |
| JP | H05-302677 A | | 11/1993 | |
| JP | H07-4532 A | | 1/1995 | |
| JP | H10-299907 A | | 11/1998 | |
| JP | 2005-344765 A | | 12/2005 | |
| JP | 2011-047290 A | | 3/2011 | |

(56) References Cited

FOREIGN PATENT DOCUMENTS

| JP | 2011-196464 A | 10/2011 | | |
|----|---------------|---------|---|---|
| JP | 2012-031883 A | 2/2012 | | |
| WO | 2011/076891 A1 | 6/2011 | | |
| WO | WO 2011076891 A1 * | 6/2011 | ............... | F02D 9/10 |

OTHER PUBLICATIONS

Mar. 24, 2015 Search Report issued in International Patent Application No. PCT/JP2014/084128.
Apr. 21, 2017 Office Action issued in Chinese Patent Application No. 201480070920.9.
Mar. 24, 2015 Search Report issued in International Patent Application No. PCT/JP2014/084125.
U.S. Appl. No. 15/038,097, filed May 20, 2016.
Jun. 28, 2016 International Preliminary Report on Patentability issued in International Patent Application No. PCT/JP2014/084125.
Mar. 17, 2015 Office Action issued in Japanese Patent Application No. 2015-501258.
Aug. 8, 2017 Office Action Issued in U.S. Appl. No. 15/038,097.

* cited by examiner

FV: FLOW VELOCITY

FV: FLOW VELOCITY

FV: FLOW VELOCITY

FV: FLOW VELOCITY

FV: FLOW VELOCITY

FV: FLOW VELOCITY

FV: FLOW VELOCITY

FV: FLOW VELOCITY

FV: FLOW VELOCITY

FV: FLOW VELOCITY

DOUBLE ECCENTRIC VALVE

This is a US national phase application based on the PCT International Patent Application No. PCT/JP2014/084125 filed on Dec. 24, 2014, and claiming the priority of Japanese Patent Applications No. 2013-267944 filed on Dec. 25, 2013, the entire contents of which are herewith incorporated by reference.

TECHNICAL FIELD

The present invention relates to a double eccentric (offset) valve in which a valve element is placed with its rotation center positioned eccentrically from a center of a valve hole of a valve seat and a sealing surface of the valve element is positioned eccentrically from the rotation center of the valve element.

BACKGROUND ART

As one example of the techniques of the type described above, there is conventionally known a ball-valve type double eccentric valve disclosed in Patent Document 1 listed below. This double eccentric valve is shown in sectional views of FIGS. 41 and 42 (corresponding to FIGS. 2(a) and (b) in Patent Document 1). This double eccentric valve is provided with a housing 52 having a passage 51 for fluid, a valve seat 53 including a valve hole 53a and an annular seat surface 53b formed on the edge of the valve hole 53a, a valve element 54 having a circular disc shape and an annular sealing surface 54a on its outer periphery corresponding, or conformable, to the seat surface 53b, and a rotary shaft 55 to rotate the valve element 54. Herein, the axis L1 of the rotary shaft 55 extends in parallel to a diametrical direction of the valve element 54 and the valve hole 53a and also is positioned eccentrically from the center of the valve hole 53a in a radial direction of the valve hole 53a. Further, the sealing surface 54a is placed eccentrically toward an extending direction of an axis L2 of the valve element 54 from an axis L1 of the rotary shaft 55. Furthermore, the valve element 54 is configured to rotate about the axis L1 of the rotary shaft 55 from a fully closed state where the sealing surface 54a is in surface contact with the seat surface 53b to a fully open state where the sealing surface 54a is furthest away from the seat surface 53b. In this double eccentric valve, the valve seat 53 is provided with an elastic member (an upstream-side cylindrical seal member 56, a downstream-side cylindrical seal member 57, and a surface pressure generating means 58) to hold the seat surface 53b of the valve seat 53 in pressure contact with the sealing surface 54a of the valve element 54 during full close to enhance sealing performance in the fully closed state. While fluid pressure acts on the valve element 54, the elastic member presses the valve seat 53 against the valve element 54, thereby blocking up a gap or clearance between the valve element 54 and the valve seat 53. FIGS. 41 and 42 illustrate a central cross section of the passage 51, the valve seat 53, the valve element 54, and the rotary shaft 55, taken along a line passing through the centers of the passage 51 and the valve seat 53 and extending in a direction perpendicular to the axis L1 of the rotary shaft 55.

RELATED ART DOCUMENTS

Patent Documents

Patent Document 1: JP-A-2011-196464

SUMMARY OF INVENTION

Problems to be Solved by the Invention

In the double eccentric valve disclosed in Patent Document 1, since the valve seat 53 is pressed against the valve element 54 by the elastic member, the sealing performance in the fully closed state is improved; however, the valve seat 53 and the valve element 54 may rub against each other through the seat surface 53b and the sealing surface 54a at the time of valve opening from the fully closed state, leading to deterioration in valve-opening response. In this double eccentric valve, furthermore, the valve element 54 comes into contact with the valve seat 53 at an early stage near a valve closed position and rotates, while contacting, to a fully closed position. Thus, the valve seat 53 and the valve element 54 rubbing against each other cause their abrasion or wear. This causes a problem with durability. Furthermore, the elastic member is provided to constitute the double eccentric valve, so that the number of components is increased by just that much, resulting in a complicated structure.

In the double eccentric valve disclosed in Patent Document 1, as shown in FIGS. 41 and 42, when the valve element 54 is rotated in a valve opening direction from the fully closed position, one side part (a first side part) 61 of the valve element 54, located on one side of a boundary defined by the axis L1 of the rotary shaft 55, is rotated toward the inside of the valve hole 53a, while the other side part (a second side part) 62 of the valve element 54 located on the other side of the boundary is rotated toward the outside of the valve hole 53a. Herein, as the valve element 54 rotates from the fully closed position in the valve opening direction, a shortest distance (a first shortest distance) G1 and a passage area (a first passage area) A1 of a gap formed between the outer periphery of the second side part 62 of the valve element 54 and the inner wall of the passage 11 will change in association with the rotation of the valve element 54 by the definition that the first shortest distance G1 and the first passage area A1 determined when the valve element 54 is in the fully closed position as shown in FIG. 41 are respective initial values. A shortest distance (a second shortest distance) G2 and a passage area (a second passage area) A2 of a gap formed between the second side part 62 of the valve element 54 and the seat surface 53b of the valve seat 53 will increase in association with the rotation of the valve element 54 by the definition that the second shortest distance G2 and the second passage area A2 determined when the valve element 54 is in the fully closed position are zero. In the course of the valve element 54 rotating from the fully closed position in the valve opening direction, therefore, a flow rate of a fluid flowing on the side of the second side part 62 is influenced by a relationship between the first shortest distance G1 and the second shortest distance G2 or a relationship between the first passage area A1 and the second passage area A2. Specifically, even when the second shortest distance G2 and the second passage area A2 gradually increase as the valve element 54 rotates, if the first shortest distance G1 is shorter than the second shortest distance G2, alternatively, if the first passage area A1 is smaller than the second passage area A2, the fluid flow rate is likely limited due to the first shortest distance G1 or the first passage area A1.

Herein, FIG. 43 is a graph showing a relationship of the first shortest distance G1 to the rotation angle (opening degree) of the valve element 54 in the double eccentric valve in Patent Document 1. FIG. 44 is a graph showing a relationship of a distance ratio G1/G2 between the first shortest distance G1 and the second shortest distance G2 to the rotation angle (opening degree) of the valve element 54. As shown in FIG. 43, for an opening degree range of 0° (degree) to about 50°, it is found that the first shortest distance G1 is shorter than the initial value (about 3 mm). Specifically, in this opening degree range, the second shortest distance G2 is conceived to gradually increase, whereas the first shortest distance G1 becomes shorter than the initial value. As shown in FIG. 44, accordingly, the distance ratio G1/G2 gradually decreases from an infinite value to a minimum value for the opening degree range of 0° to 40° and gradually increases from the minimum value for the opening degree range of about 40° to 90°. However, since the first shortest distance G1 is not larger than the second shortest distance G2, the distance ratio G1/G2 for the opening degree range of 10° to 90° becomes smaller than 1.0. It is conceived that a similar or approximate tendency to this is also obtained as a relationship between the first passage area A1 and the second passage area A2.

From the above results, it is impossible to ensure an appropriate fluid flow rate according to changes in the second shortest distance G2 or the second passage area A2 (that is, changes in the opening degree of the valve element 54). In this respect, in the double eccentric valve disclosed in Patent Document 1, as shown in FIG. 41, the first shortest distance G1 or the first passage area A1 when the valve element 54 is in the fully closed position merely corresponds to nearly the thickness of the valve seat 53. In particular, for the opening degree range of 10° to 90°, it is estimated that the first shortest distance G1 is shorter than the second shortest distance G2 and the first passage area A1 is smaller than the second passage area A2. This double eccentric valve therefore could not achieve appropriate flow characteristics according to changes in the opening degree of the valve element 54 from the fully closed position.

The present invention has been made in view of the circumstances and has a purpose to provide a double eccentric valve capable of ensuring sealing performance in a fully closed state and achieving improved valve-opening response and improved durability with a simple structure. Another purpose of the present invention is to provide a double eccentric valve capable of ensuring appropriate flow characteristics according to changes in an opening degree of a valve element from a fully closed position in addition to the above purpose.

Means of Solving the Problems (1) To achieve the above purpose, one aspect of the invention provides a double eccentric valve comprising: a valve seat including a valve hole and an annular seat surface formed on an edge of the valve hole; a valve element having a circular disc shape and including an annular sealing surface formed on an outer periphery, the sealing surface corresponding to the seat surface; a passage allowing a fluid to flow through, the valve seat and the valve element being placed in the passage; a rotary shaft to rotate the valve element, and the rotary shaft having an axis extending in parallel to a radial direction of the valve element and the valve hole, the axis being positioned eccentrically from a center of the valve hole in a radial direction of the valve hole, the sealing surface being positioned eccentrically from the axis of the rotary shaft toward an extending direction of an axis of the valve element, so that the valve element is configured to rotate about the axis of the rotary shaft between a fully closed position where the sealing surface is in surface contact with the seat surface and a fully open position where the sealing surface is furthest away from the seat surface, wherein the valve element is partitioned into two regions; a first side part and a second side part with respect to a boundary defined by a virtual plane extending from the axis of the rotary shaft and in parallel to an extending direction of a central axis of the valve hole, the sealing surface includes an outermost edge which will contact with the seat surface at a position close to an outer periphery of the seat surface and an innermost edge which will contact with the seat surface at a position close to an inner periphery of the seat surface, the valve element is configured such that, when the valve element rotates from the fully closed position in the valve opening direction, the first side part is rotated toward inside of the valve hole and the second side part is rotated toward outside of the valve hole, and the outermost edge and the innermost edge of the sealing surface are respectively rotated along rotation paths about the axis of the rotary shaft, and the seat surface is inclined toward a center of the valve hole so that an angle of the seat surface circumscribing the rotation path of the outermost edge of the sealing surface of the first side part in the fully closed position is a maximum value and an angle of the seat surface circumscribing the rotation path of the innermost edge of the sealing surface of the second side part is a minimum value.

According to the foregoing structure (1), the valve element is rotated about the main axis of the rotary shaft between the fully closed position in which the sealing surface of the valve element contacts with the seat surface and the fully open position in which the sealing surface is furthest away from the seat surface. In the fully closed state, the valve hole of the valve seat is blocked up by the valve element, thereby shutting off a flow of fluid in the valve hole. Further, contact between the sealing surface and the seat surface seals a gap between the valve element and the valve seat, thereby preventing leakage of the fluid without providing any special elastic member for pressing the valve seat against the valve element. In the valve open stated, in contrast, the valve hole of the valve seat is opened to allow the fluid to flow through the valve hole. At the same time when the valve element starts to rotate from the fully closed position in the valve opening direction, the sealing surface of the valve element also starts to separate from the seat surface and move along the rotation path about the axis of the rotary shaft, so that a rubbing or friction amount between the sealing surface and the seat surface is reduced to the minimum.

Furthermore, when the valve element rotates from the fully closed position in the valve opening direction, the first side part of the valve element is turned toward the inside of the valve hole. Accordingly, the outermost edge of the sealing surface of the first side part rotates along the rotation path about the axis of the rotary shaft and finally goes out of the range of the seat surface of the valve seat. Herein, in the fully closed position, an angle of the seat surface circumscribing the rotation path of the outermost edge of the sealing surface of the first side part is a maximum value. Thus, after start of rotation of the first side part, the outermost edge no longer contacts with the seat surface. In contrast, when the valve element rotates from the fully closed position in the valve opening direction, the second side part of the valve element is turned toward the outside of the valve hole. Accordingly, the innermost edge of the sealing surface of the second side part rotates along the rotation path about the axis of the rotary shaft and finally goes out of the range of the seat surface of the valve seat.

Herein, in the fully closed position, an angle of the seat surface circumscribing the rotation path of the innermost edge of the sealing surface of the second side part is a minimum value. Thus, after start of rotation of the second side part, the innermost edge no longer contacts with the seat surface.

Effects of the Invention

According to the foregoing configuration (1), the double eccentric valve can achieve the sealing property in the fully closed state and provide improved valve-opening response and improved durability with simple structure without providing any special elastic member.

MODE FOR CARRYING OUT THE INVENTION

A detailed description of an embodiment of a double eccentric valve of the present invention, which is embodied in an exhaust recirculation valve (EGR valve), will now be given referring to the accompanying drawings.

Figure 1:
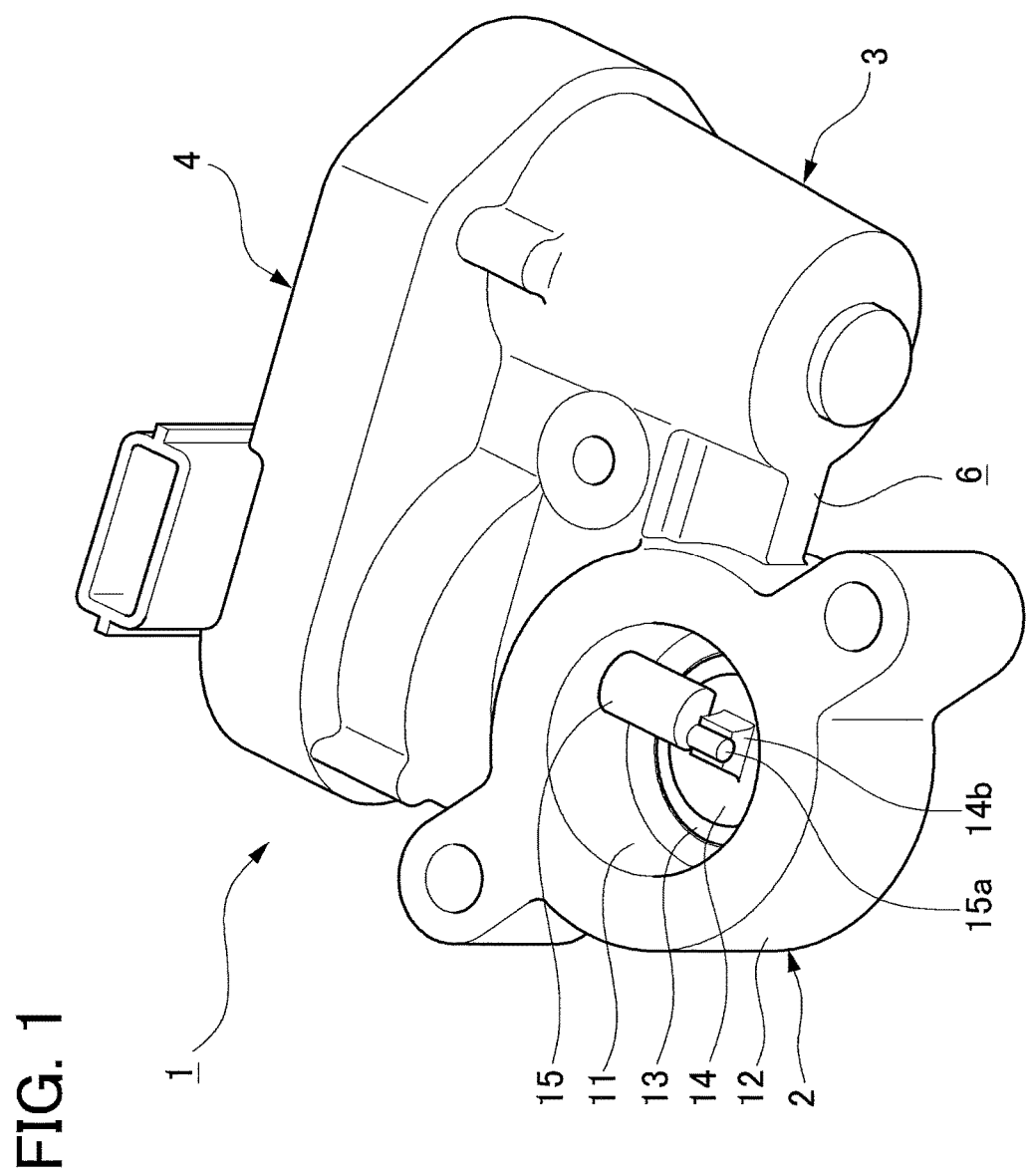
FIG. 1 is a perspective view showing an electrically-operated EGR valve provided with a double eccentric valve in an embodiment.

FIG. 1 is a perspective view of an electrically-operated EGR valve 1 provided with a double eccentric valve. This EGR valve 1 includes a valve section 2 constituted by the double eccentric valve, a motor section 3 having a motor 32 built therein, and a reduction mechanism section 4 having a plurality of gears built therein. The valve section 2 includes a pipe part 12 formed with a passage 11 allowing EGR gas as a fluid to flow therethrough. In this passage 11, a valve seat 13, a valve element 14, and a rotary shaft 15 are arranged. The internal shape of the passage 11, the outer shape of the valve seat 13, and the outer shape of the valve element 14 are each circular or approximately circular in plan view. The rotary shaft 15 receives torque of the motor through the plurality of gears. In the present embodiment, the pipe part 12 having the passage 11 corresponds to a part of a housing 6 of the invention and the motor of the motor section 3 and the plurality of gears of the reduction mechanism section 4 are covered with this housing 6. The housing 6 is made of metal such as aluminum.

Figure 2:
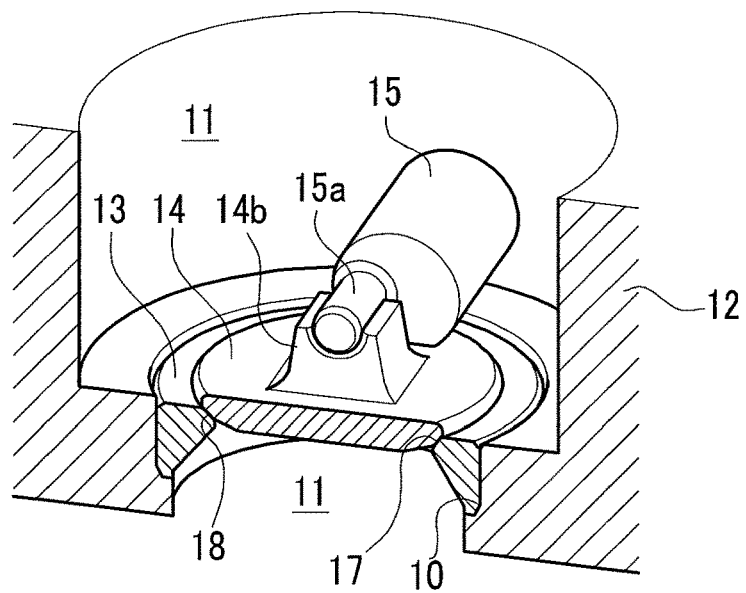
FIG. 2 is a partially cutaway perspective view of a valve section in a fully closed state in the embodiment.
Figure 3:
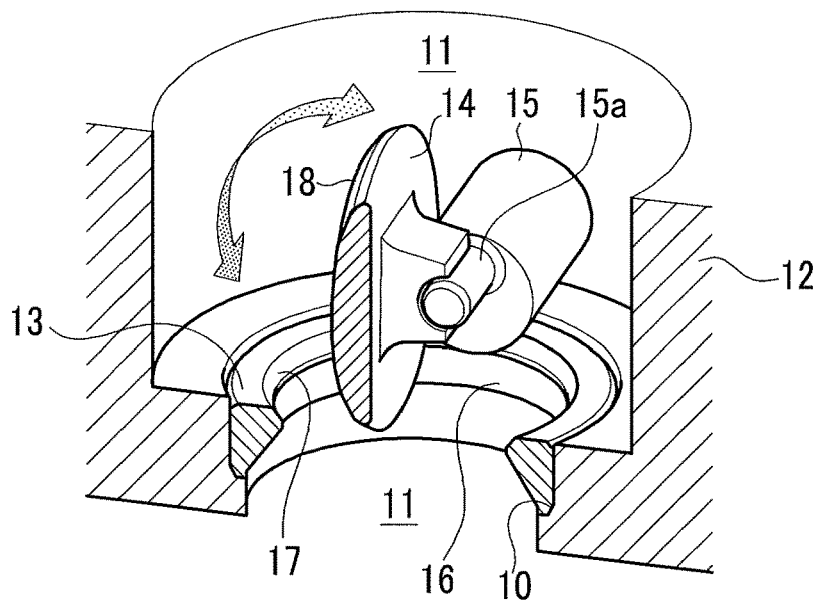
FIG. 3 is a partially cutaway perspective view of a valve section in a fully open state in the embodiment.

FIG. 2 is a partially cutaway perspective view of the valve section 2 in a fully closed state in which the valve element 14 is seated on the valve seat 13. FIG. 3 is a partially cutaway perspective view of the valve section 2 in a fully open state in which the valve element 14 is furthest away from the valve seat 13. As shown in FIGS. 2 and 3, the passage 11 is formed with a step 10 on which the valve seat 13 is fitted. The valve seat 13 has an annular shape formed with a circular or approximately circular valve hole 16 in the center. On an edge of the valve hole 16, an annular seat surface 17 is formed. The valve element 14 has a circular disc shape with an annular sealing surface 18 on an outer periphery corresponding to the seat surface 17. The valve element 14 is fixed to the rotary shaft 15 and movable integrally with the rotary shaft 15. In FIGS. 2 and 3, the passage 11 above the valve element 14 indicates an upstream side in a flow of EGR gas and the passage 11 below the valve seat 13 indicates a downstream side in the flow of EGR gas. In the passage 11, specifically, the valve element 14 is placed on a more upstream side in a flow direction of EGR gas than the valve seat 13.

Figure 4:
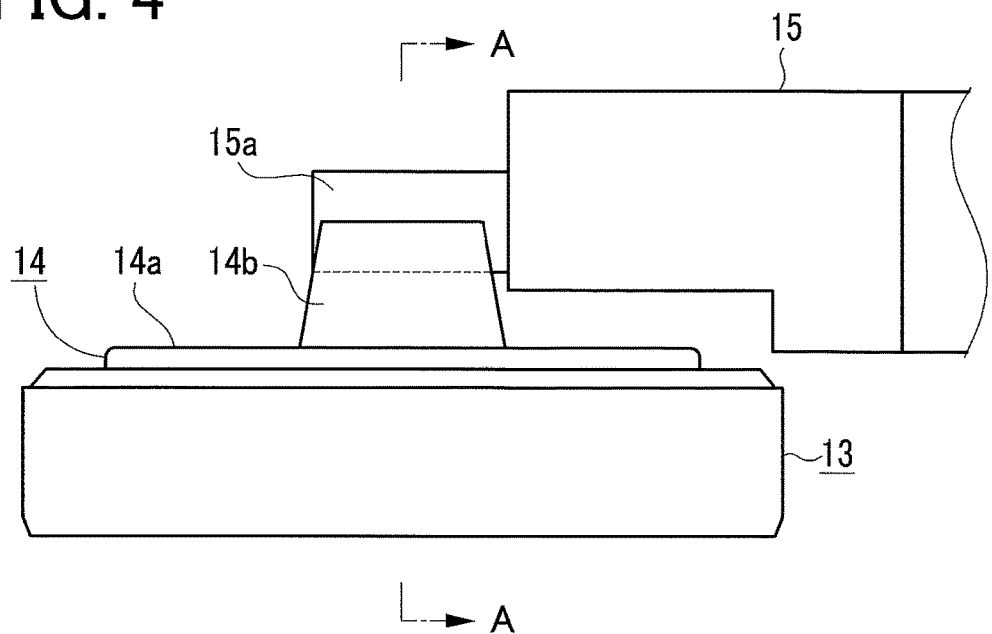
FIG. 4 is a side view of a valve seat, a valve element, and a rotary shaft in the fully closed state in the embodiment.
Figure 5:
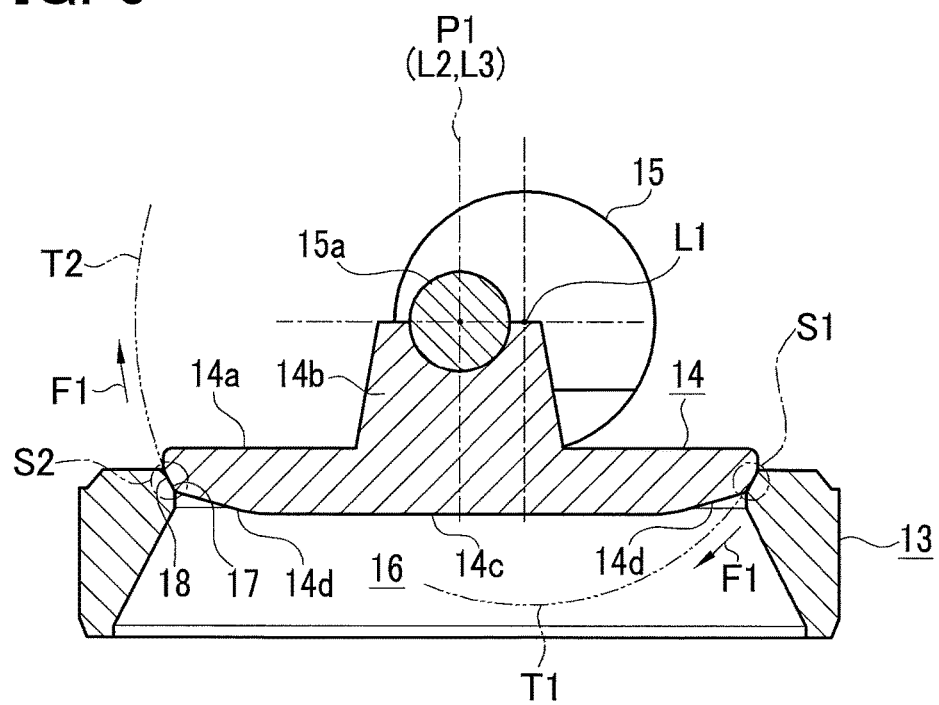
FIG. 5 is a sectional view of the valve seat, the valve element, and the rotary shaft in the fully closed state, taken along a line A-A in FIG. 4 in the embodiment.
Figure 6:
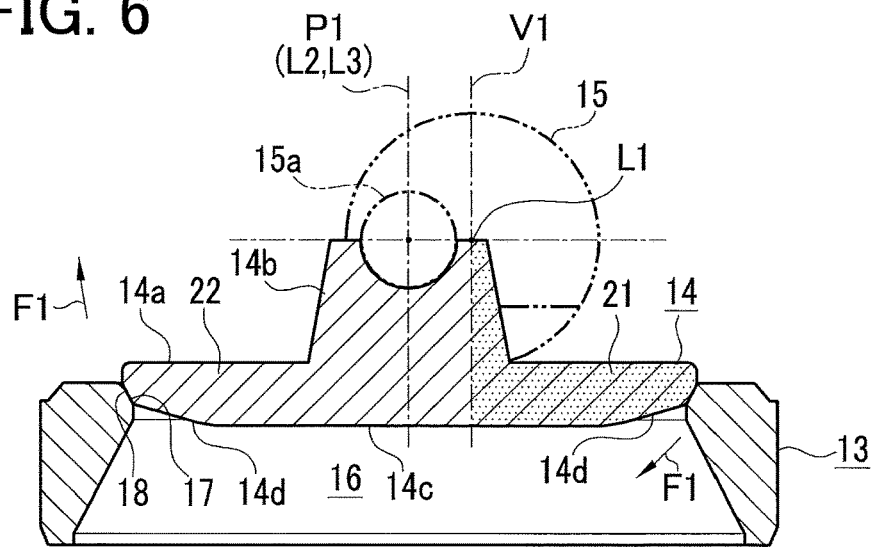
FIG. 6 is a sectional view of the valve seat and the valve element in the fully closed state in the embodiment.
Figure 7:
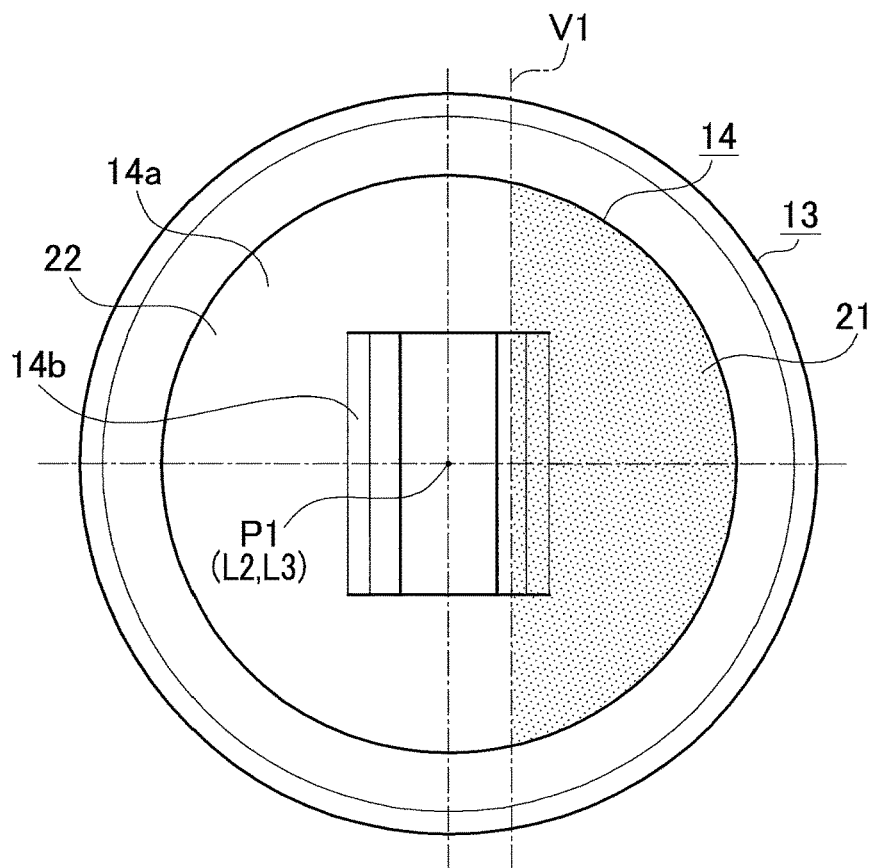
FIG. 7 is a plan view of the valve seat and the valve element in the fully closed state in the embodiment.

FIG. 4 is a side view of the valve seat 13, the valve element 14, and the rotary shaft 15 in a fully closed state. FIG. 5 is a sectional view of the valve seat 13, the valve element 14, and the rotary shaft 15 in the fully closed state, taken along a line A-A in FIG. 4. FIG. 6 is a sectional view of the valve seat 13 and the valve element 14 in the fully closed state. FIG. 7 is a plan view of the valve seat 13 and the valve element 14 in the fully closed state. As shown in FIGS. 2 to 7, an axis L1 of the rotary shaft 15 extends in a direction parallel to the diametrical direction of the valve element 14 and the valve hole 16 and is positioned eccentrically, or offset, from the center P1 of the valve hole 16 in a radial direction of the valve hole 16, and also the sealing surface 18 of the valve element 14 is placed eccentrically, or offset, from the axis L1 of the rotary shaft 15 toward an extending direction of an axis L2 of the valve element 14. The valve element 14 is configured to rotate about the axis L1 of the rotary shaft 15 between a fully closed position in which the sealing surface 18 of the valve element 14 is in surface contact with the seat surface 17 of the valve seat 13 (see FIG. 2) and a fully open position in which the sealing surface 18 is furthest away from the seat surface 17 (see FIG. 3).

In the present embodiment, in FIG. 5, when the valve element 14 starts to rotate from the fully closed position in a valve opening direction (an arrow F1 direction in FIG. 5, that is, clockwise in FIG. 5), the sealing surface 18 of the valve element 14 simultaneously starts to separate from the seat surface 17 of the valve seat 13 and to move along rotation paths (trajectories) T1 and T2 about the axis L1 of the rotary shaft 15.

Figure 8:
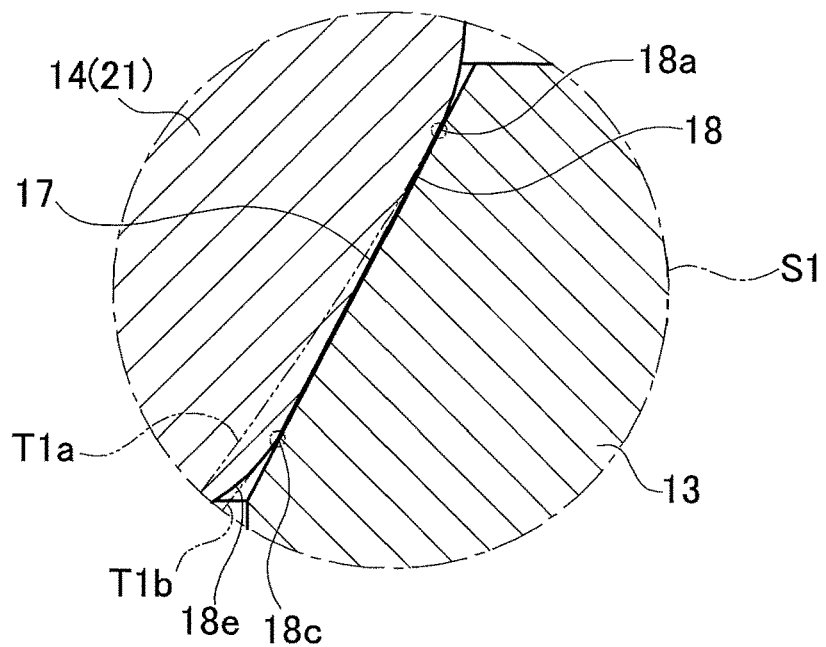
FIG. 8 is an enlarged sectional view of a region enclosed by a chain line circle S1 in FIG. 5 in the embodiment.
Figure 9:
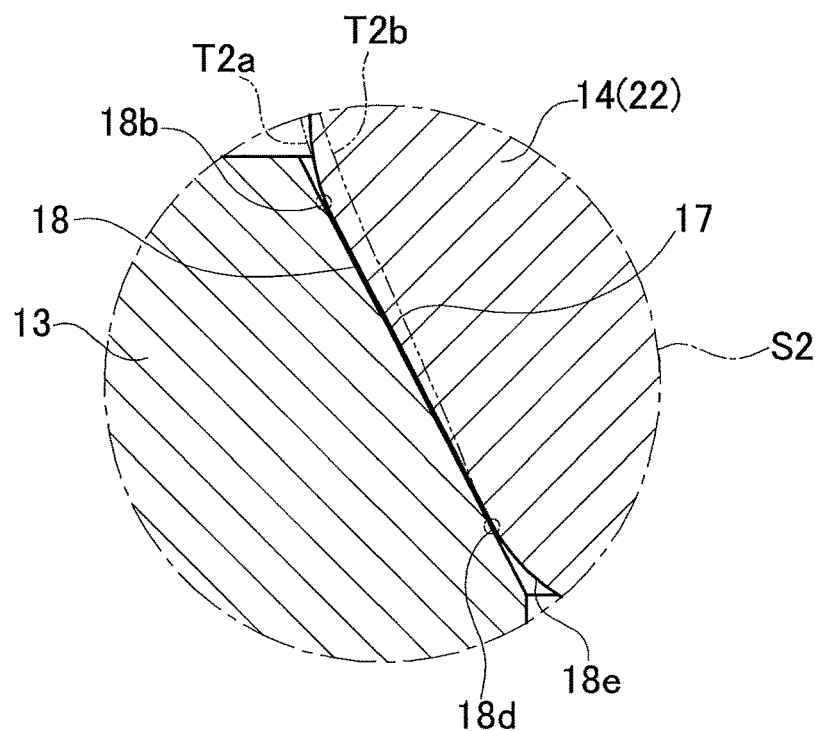
FIG. 9 is an enlarged sectional view of a region enclosed by a chain line circle S2 in FIG. 5 in the embodiment.

FIG. 8 is an enlarged sectional view of a region enclosed by a chain line circle S1 in FIG. 5. FIG. 9 is an enlarged sectional view of a region enclosed by a chain line circle S2 in FIG. 5. As shown in FIGS. 6 and 7, the valve element 14 is partitioned into two regions; one is a first side part 21 (a region shaded with dot hatching in FIGS. 6 and 7) and a second side part 22 (a region not shaded with dot hatching in FIGS. 6 and 7), with respect to a boundary defined by a virtual plane V1 extending from the axis L1 of the rotary shaft 15 and in parallel to an extending direction of the central axis L3 of the valve hole 16. As shown in FIGS. 8 and 9, the sealing surface 18 of the valve element 14 includes outermost edges 18a and 18b located close to an outer circumference of the seat surface 17 of the valve seat 13 and innermost edges 18c and 18d located close to an inner circumference of the seat surface 17. When the valve element 14 rotates from the fully closed position shown in FIG. 6 in a valve opening direction indicated with an arrow F1, the first side part 21 rotates toward the inside of the valve hole 16 and the second side part 22 rotates toward the outside of the valve hole 16. Simultaneously, the outermost edges 18a and 18b and the innermost edges 18c and 18d of the sealing surface 18 of the valve element 14 are respectively turned along rotation paths T1a, T2a, T1b, and T2b about the axis L1 of the rotary shaft 15. Herein, "T1a" denotes a rotation path of the outermost edge 18a of the first side part 21, "T2a" denotes a rotation path of the outermost edge 18b of the second side part 22, "T1b" denotes a rotation path of the innermost edge 18c of the first side part 21, and "T2b" denotes a rotation path of the innermost edge 18d of the second side part 22. In the fully closed position shown in FIG. 6, the seat surface 17 of the valve seat 13 is inclined toward the center P1 of the valve hole 16 so that the angle of the seat surface 17 circumscribing the rotation path T1a of the outermost edge 18a of the sealing surface 18 of the first side part 21 as shown in FIG. 8 is a maximum value and the angle of the seat surface 17 circumscribing the rotation path T2b of the innermost edge 18d of the sealing surface 18 of the second side part 22 as shown in FIG. 9 is a minimum value.

Herein, as shown in FIGS. 2 and 3, each of the seat surface 17 of the valve seat 13 and the sealing surface 18 of the valve element 14 has a uniform shape over its entire circumference. Specifically, the width and the sectional shape of the seat surface 17 and the width and the sectional shape of the sealing surface 18 are formed uniformly over respective entire circumferences of the valve hole 16 and the valve element 14.

As shown in FIGS. 4 to 7, the valve element 14 includes a fixed part 14b having a mountain shape protruding from a plate surface 14a and fixed to the rotary shaft 15. This fixed part 14b is attached to the rotary shaft 15 through a pin 15a protruding from the distal end of the rotary shaft 15 in a position displaced from the axis L1 of the rotary shaft 15 in the radial direction of the rotary shaft 15. Further, as shown in FIGS. 5 to 7, the fixed part 14b is placed on the axis L2 of the valve element 14, and the valve element 14 including the fixed part 14b is formed in a symmetric shape about the axis L2 of the valve element 14. The valve element 14 includes, as shown in FIG. 6, a flat bottom surface 14c on a lower side, that is, on a side facing the valve hole 16. The valve element 14 is formed with a tapered surface 14d between the sealing surface 18 and the bottom surface 14c. The tapered surface 14d is inclined from the innermost edges 18c and 18d of the sealing surface 18 to the bottom surface 14c. As shown in FIGS. 8 and 9, a joining portion 18e joining each innermost edge 18c and 18d of the sealing surface 18 to the tapered surface 14d is an outwardly protruding curved-surface.

Figure 10:
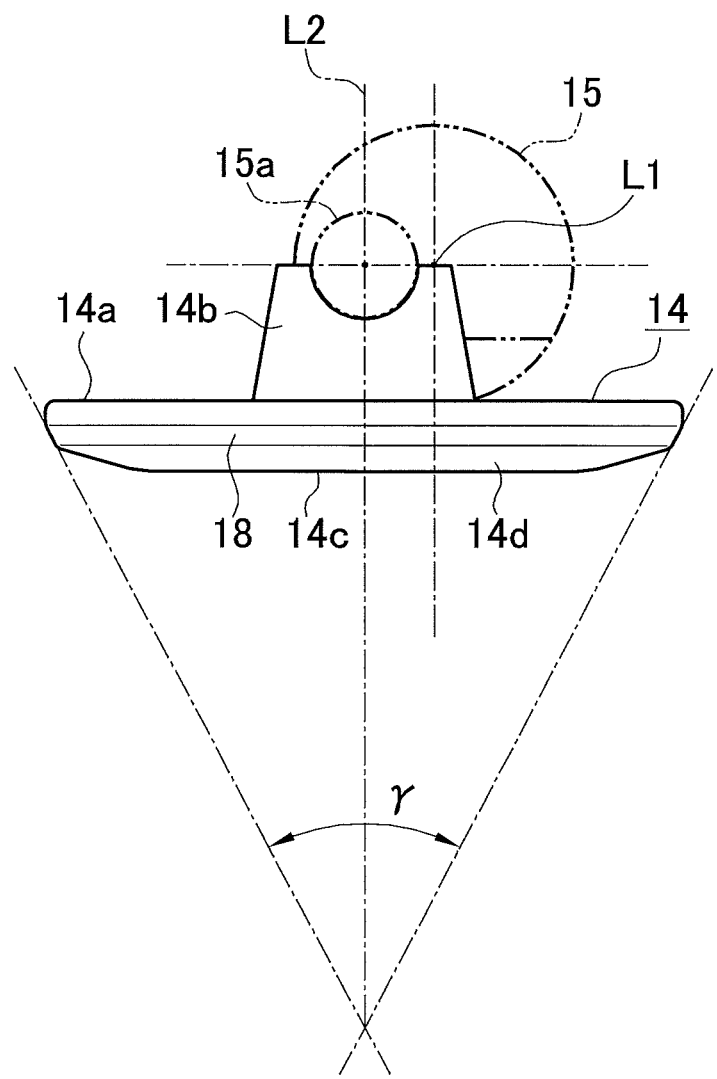
FIG. 10 is a front view of the valve element in the embodiment.
Figure 11:
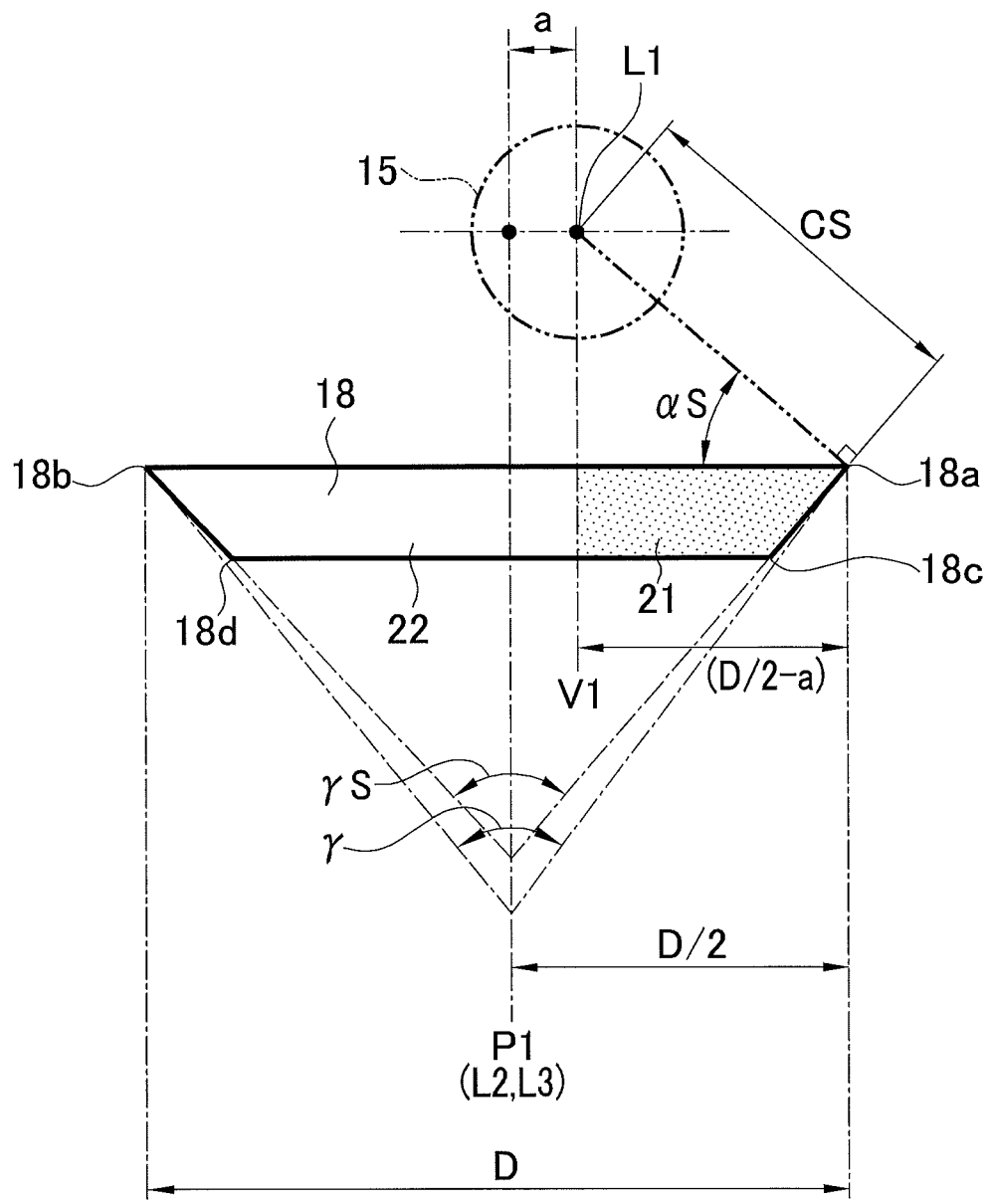
FIG. 11 is a schematic diagram showing a relationship in size of a sealing surface in FIG. 10 in the embodiment.
Figure 12:
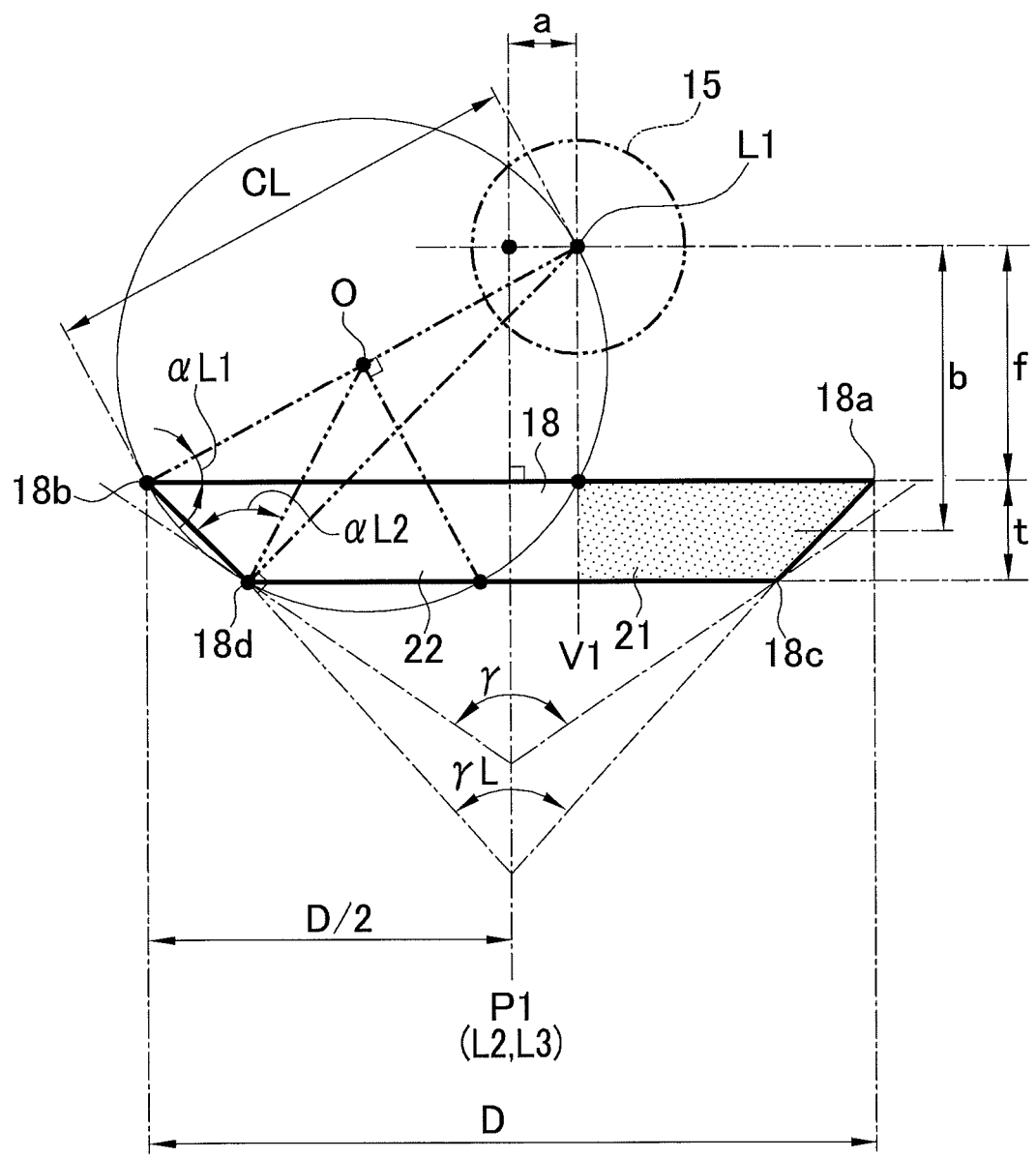
FIG. 12 is a schematic diagram showing a relationship in size of the sealing surface in FIG. 10 in the embodiment.

FIG. 10 is a front view of the valve element 14. FIGS. 11 and 12 are schematic diagrams showing a relationship in size of the sealing surface 18 in FIG. 10. In FIG. 10, when an optimal open angle formed by the sealing surface 18 of the valve element 14 is assumed to be "γ", this optimal open angle γ can be set in the following manner. Specifically, in a state in which a first line extending at a shortest distance from the axis L1 of the rotary shaft 15 to the outermost edge 18a of the sealing surface 18 of the first side part 21 intersects with the sealing surface 18, a first open angle γS of the sealing surface 18 is determined by the following equation (1):

$$\gamma S = 2 * \arccos((D/2-a)/CS)[\text{rad}] \quad (1)$$

where CS is the length of this first line, α is an offset amount of the axis L1 of the rotary shaft 15 offset from the central axis L3 of the valve hole 16 in the radial direction of the valve hole 16, and D is the largest diameter of the sealing surface 18. This equation (1) is established from a relationship that when an angle formed between a first line extending from the axis L1 of the rotary shaft 15 to the center of the outermost edge 18a of the sealing surface 18 of the first side part 21 and the plane including the outermost edges 18a and 18b of the sealing surface 18 is determined to be a first angle αS in FIG. 11, an angle twice as large as the first angle αS corresponds to the first open angle γS.

In a state in which a second line extending from the axis L1 of the rotary shaft 15 to the innermost edge 18d of the sealing surface 18 of the second side part 22 by a largest distance intersects with the sealing surface 18 as shown in FIG. 12, a second open angle γL of the sealing surface 18 is determined by the following equations (2) and (3):

$$\gamma L = \arcsin((f/2+t)/(CL/2)) + \arctan(f/(D/2+a))[\text{rad}] \quad (2)$$

$$f = b - t/2 \quad (3)$$

where CL is a longest distance from the axis L1 of the rotary shaft 15 to the outermost edge 18b of the sealing surface 18 of the second side part 22, t is the thickness of the sealing surface 18 in an axial direction, and b is an offset amount of the rotary shaft 15 offset from the center of the thickness t of the sealing surface 18 of the valve element 14 in a direction of the axis L2 of the valve element 14. These equations (2) and (3) are established from a relationship that when an angle formed between a line extending from the axis L1 of the rotary shaft 15 to the outermost edge 18b of the sealing surface 18 of the second side part 22 and a plane including the outermost edges 18a and 18b of the sealing surface 18 is determined to be a second angle αL1, and a virtual circle is plotted to have a diameter corresponding to the longest distance CL and passing through each of the outermost edge 18b, the innermost edge 18d, and the axis L1 as in FIG. 12, a third angle αL2 formed by a line extending from the center point O of the virtual circle to the innermost edge 18d and a plane including the outermost edge 18b and the innermost edge 18d of the sealing surface 18 is determined, thereby enabling determining the second open angle γL.

In the present embodiment, the optimal open angle γ of the sealing surface 18 is set to meet the condition of the following equation (4):

$$\gamma L \leq \gamma \leq \gamma S \quad (4)$$

Figure 13:
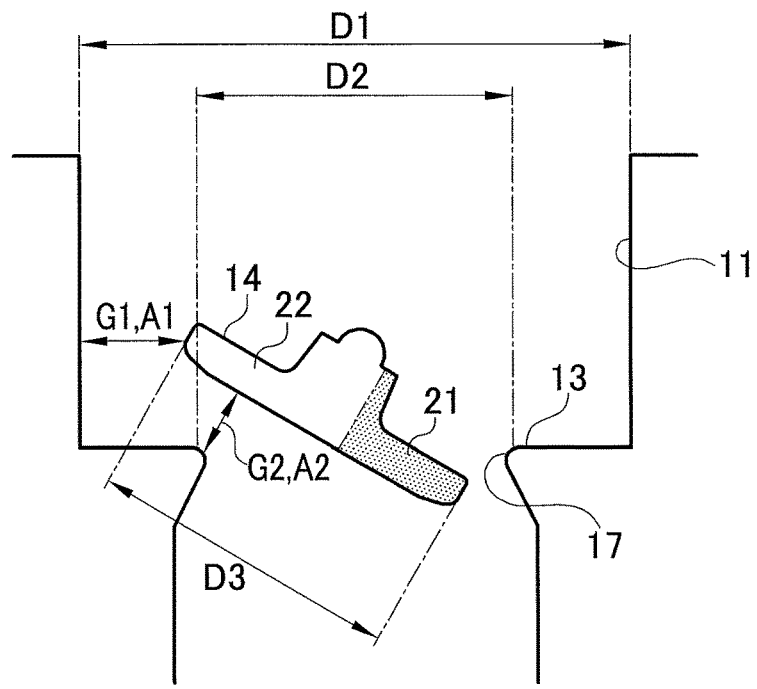
FIG. 13 is a schematic diagram showing a relationship between a passage, the valve seat, and the valve element when an opening degree of the valve element is 40° in the embodiment.
Figure 14:
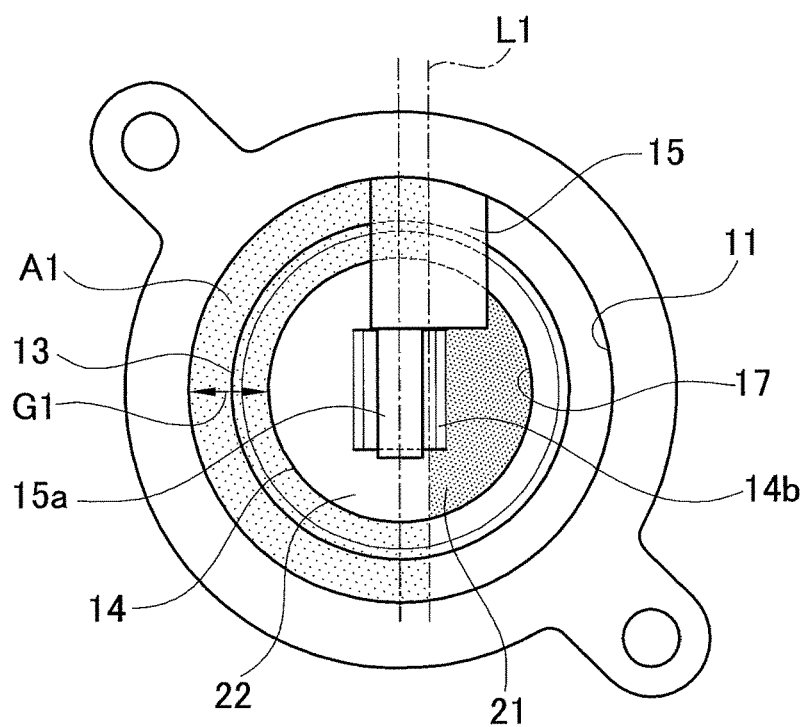
FIG. 14 is a plan view of a pipe section when the valve element is in a fully closed position in the embodiment.

Herein, the relationship in shape and size between the passage 11 of the pipe section 12, the valve seat 13, and the valve element 14 will be explained below. FIG. 13 is a schematic diagram showing a relationship between the passage 11, the valve seat 13, and the valve element 14 when the opening degree of the valve element 14 is 40°. This schematic diagram of FIG. 13 illustrates a central cross section of the passage 11, the valve seat 13, and the valve element 14, taken along a line passing through the center of the passage 11 and the valve seat 13 and extending in a direction perpendicular to the axis L1 of the rotary shaft 15. FIG. 14 is a plan view of the pipe section 12 when the valve element 14 is in the fully closed position. As shown in FIGS. 13 and 14, it is assumed that a shortest distance of a gap to be formed between the outer periphery of the second side part 22 of the valve element 14 and the inner wall of the passage 11 when the valve element 14 rotates from the fully closed position in the valve opening direction is a first shortest distance G1 and a passage area of EGR gas to be obtained at that time is a first passage area A1. Further, it is assumed that a gap to be formed between the second side part 22 and the seat surface 17 of the valve seat 13 corresponding to the second side part 22 when the valve element 14 rotates from the fully closed position in the valve opening direction is a second shortest distance G2 and a passage area of EGR gas to be obtained at that time is a second passage area A2. In the present embodiment, the shapes and the sizes of the passage 11, the valve seat 13, and the valve element 14 are designed so that the first shortest distance G1 is equal to or larger than the second shortest distance G2. Further, the shapes and the sizes of the passage 11, the valve seat 13, and the valve element 14 are also set so that the first passage area A1 is 1.3 times or more as large as the second passage area A2. For this purpose, as shown in FIG. 13, the inner wall of the passage 11 upstream of the valve element 14 has a cylindrical shape and the inner diameter D1 of the passage 11, the largest diameter D2 of the seat surface 17 of the valve seat 13, and the largest diameter D3 of the valve element 14 are set to respective predetermined values.

Figure 41:
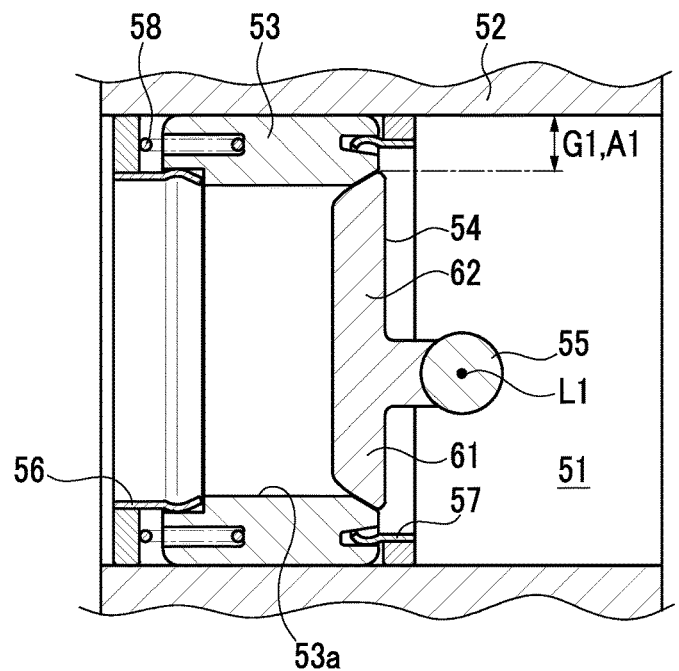
FIG. 41 is a sectional view of a double eccentric valve in a fully closed state in a related art.
Figure 42:
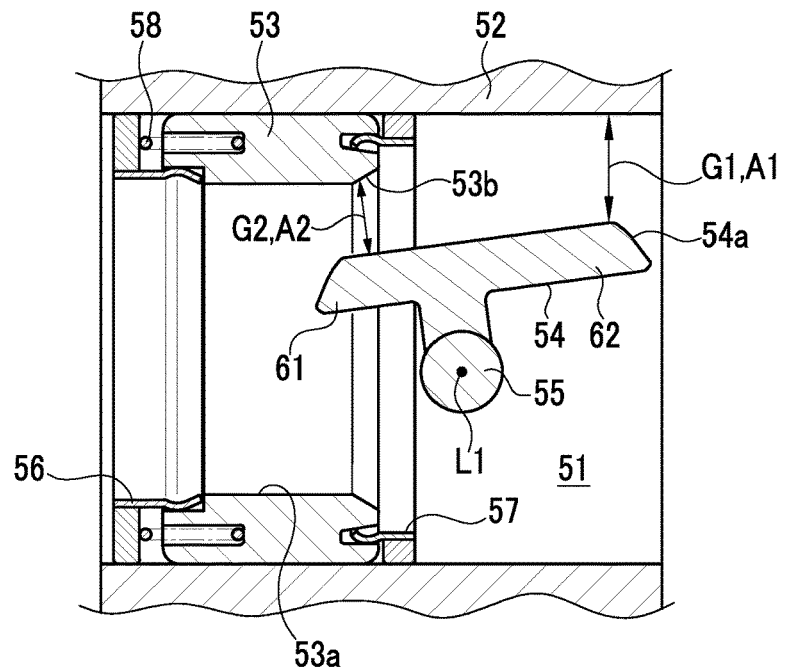
FIG. 42 is a sectional view of the double eccentric valve in an open state in the related art.
Figure 43:
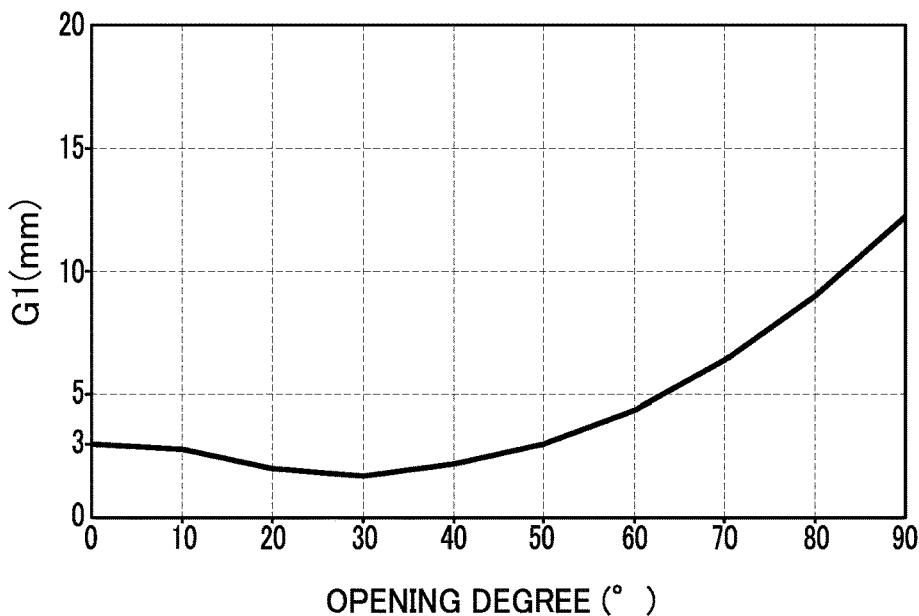
FIG. 43 is a graph showing a relationship of a first shortest distance to a rotation angle (opening degree) of a valve element in the related art.
Figure 44:
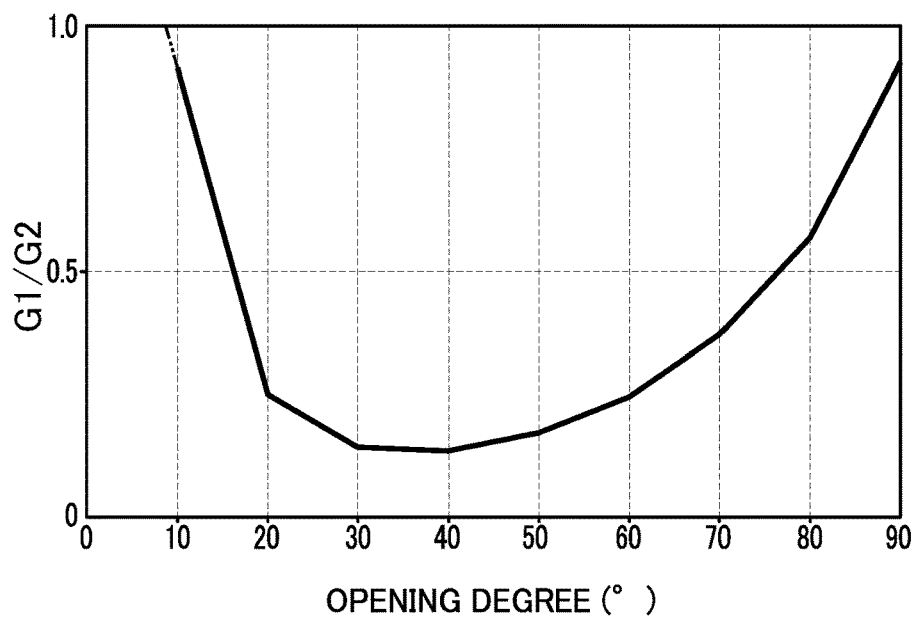
FIG. 44 is a graph showing a relationship of a distance ratio between the first shortest distance and a second shortest distance to the rotation angle (opening degree) of the valve element in the related art.

According to the double eccentric valve in the embodiment described above, the valve element 14 is rotated about the axis L1 of the rotary shaft 15 to move between the fully closed position in which the sealing surface 18 of the valve element 14 is held in surface contact with the seat surface 17 of the valve seat 13 and the fully open position in which the sealing surface 18 is furthest away from the seat surface 17. In the state where the valve element 14 is disposed in the fully closed position (the fully closed state), the valve hole 16 of the valve seat 13 is closed, shutting off a flow of EGR gas in the valve hole 16. Further, the gap between the valve element 14 and the valve seat 13 is sealed by surface contact of the sealing surface 18 and the seat surface 17, so that leakage of EGR gas can be prevented without providing any special elastic member for pressing the valve seat 13 against the valve element 14. In the related art, specifically, as shown in FIGS. 41 and 42, the valve seat 53 is pressed against the valve element 54 by the elastic member, thereby blocking up the gap between the valve element 54 and the valve seat 53. In contrast, in the present embodiment, even without any special elastic member, the configuration of the seat surface 17 of the valve seat 13 and the sealing surface 18 of the valve element 14 can ensure the sealing property of the double eccentric valve in the fully closed state.

By contrast, in the valve open state of the double eccentric valve, the valve hole 16 of the valve seat 13 is opened, allowing a flow of EGR gas to pass through the valve hole 16. At the same time when the valve element 14 starts to rotate from the fully closed position in the valve opening direction, the sealing surface 18 of the valve element 14 also starts to separate from the seat surface 17 of the valve seat 13 and move along the rotation paths T1 and T2 about the axis L1 of the rotary shaft 15. Accordingly, a rubbing or friction amount between the sealing surface 18 and the seat surface 17 is reduced to the minimum. This can make it possible to quickly rotate the valve element 14 during valve opening because of no friction between the valve element 14 and the valve seat 13, and further reduce abrasion or wear between the sealing surface 18 of the valve element 14 and the seat surface 17 of the valve seat 13 can be reduced. The double eccentric valve thus can achieve improved valve-opening response and improved durability with simple structure without installing any special elastic member.

In the present embodiment, when the valve element 14 rotates from the fully closed position in the valve opening direction, the first side part 21 of the valve element 14 is turned toward the inside of the valve hole 16. Accordingly, the outermost edge 18a of the sealing surface 18 of the first side part 21 rotates along the rotation path T1a about the axis L1 of the rotary shaft 15 and finally goes out of the range of the seat surface 17 of the valve seat 13. Herein, in the fully closed position, the angle of the seat surface 17 circumscribing the rotation path T1a of the outermost edge 18a of the sealing surface 18 of the first side part 21 is a maximum value. Thus, after start of rotation of the first side part 21, the outermost edge 18a no longer contacts with the seat surface 17. Herein, during valve opening of the valve element 14, the innermost edge 18c of the first side part 21 goes first out of the range of the seat surface 17 and no longer contacts with the seat surface 17. When the valve element 14 rotates from the fully closed position in the valve opening direction, in contrast, the second side part 22 of the valve element 14 is turned toward the outside of the valve hole 16. Thus, the innermost edge 18d of the sealing surface 18 of the second side part 22 rotates along the rotation path T2b about the axis L1 of the rotary shaft 15 and finally goes out of the range of the seat surface 17 of the valve seat 13. Herein, in the fully closed position, the angle of the seat surface 17 circumscribing the rotation path T2b of the innermost edge 18d of the sealing surface 18 of the second side part 22 is a minimum value. After start of rotation of the second side part 22, therefore, the innermost edge 18d no longer contacts with the seat surface 17. Herein, the outermost edge 18b of the second side part 22 is the first to go out of the range of the seat surface 17 during valve opening of the valve element 14 and thus the outermost edge 18b no longer contacts with the seat surface 17. In this manner, during valve opening of the valve element 14 from the fully closed position, the outermost edge 18a and the innermost edge 18d of the sealing surface 18 do not contact with the seat surface 17, so that a rubbing or friction amount of the outermost edge 18a and the innermost edge 18d with the seat surface 17 is reduced to the minimum. This can make it possible to quickly rotate the valve element 14 during valve opening because of no friction between the valve element 14 and the valve seat 13, and further reduce abrasion or wear between the sealing surface 18 of the valve element 14 and the seat surface 17 of the valve seat 13 can be reduced. The double eccentric valve thus can ensure the sealing property in the fully closed state and also achieve improved valve-opening response and improved durability with simple structure without installing any special elastic member.

In the present embodiment, the seat surface 17 of the valve seat 13 and the sealing surface 18 of the valve element 14 have only to be uniform in shape over respective circumferences. This can facilitate machining of the valve seat 13 and the valve element 14. Thus, the double eccentric valve can be manufactured with ease and at low cost.

In the present embodiment, the valve element 14 is fixed to the rotary shaft 15 through the pin 15a so that the fixed part 14b is placed in a position displaced or offset from the axis L1 of the rotary shaft 15 in the radial direction. Accordingly, eccentricity of the valve element 14 from the axis L1 is ensured with respect to the position of the axis L1 of the rotary shaft 15 acting as the rotation center of the valve element 14. Since the fixed part 14b is placed on the axis L2 of the valve element 14 and the valve element 14 including the fixed part 14b has a symmetric shape with respect to the axis L2 of the valve element 14, the fixed part 14b does not need to be formed eccentrically with respect to the axis L2 of the valve element 14. This configuration can facilitate manufacture of the valve element 14. In this respect, manufacturing of the double eccentric valve can be realized more easily and more inexpensively.

In this embodiment, in the passage 11 in which the valve seat 13 and the valve element 14 are placed, the valve element 14 is arranged on a more upstream side in an EGR gas flow direction than the valve seat 13. In the state where the valve element 14 is held in the fully closed position, accordingly, the pressure of EGR gas acts on the valve element 14 in a direction to press against the valve seat 13. Thus, the sealing property between the valve seat 13 and the valve element 14, that is, between the seat surface 17 and the sealing surface 18, can be improved.

In the present embodiment, since the optimal open angle γ of the sealing surface 18 of the valve element 14 is set to an angle formed between the second open angle γL and the first open angle γS, a rubbing or friction amount between the sealing surface 18 of the valve element 14 and the seat surface 17 of the valve seat 13 can be minimized. In this respect, the double eccentric valve can reliably achieve improved valve-opening response and durability.

Figure 15:
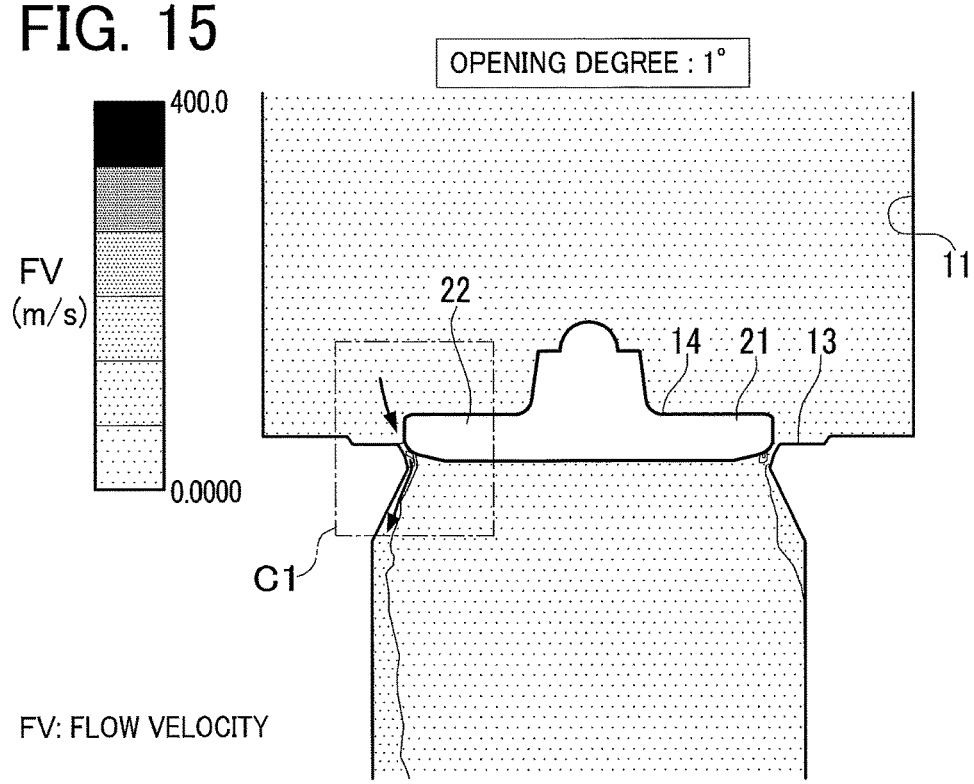
FIG. 15 is an explanatory view showing CAE analysis results of EGR gas flow velocity distribution when the opening degree of the valve element is 1° in the embodiment.
Figure 16:
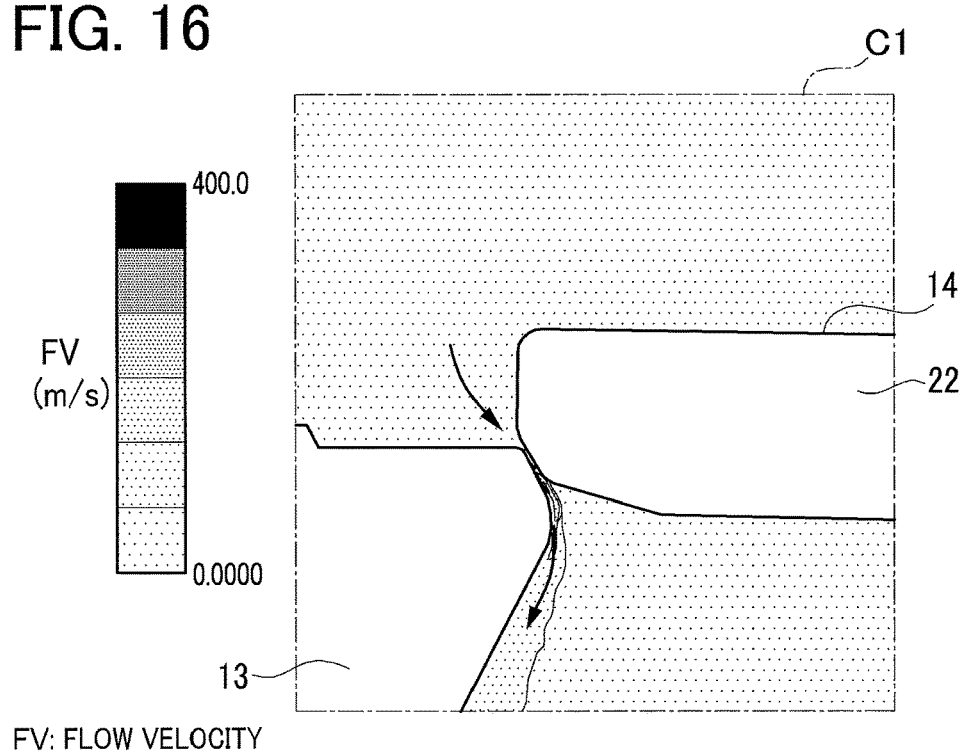
FIG. 16 is an enlarged view showing a region enclosed by a chain line rectangle in FIG. 15 in the embodiment.
Figure 17:
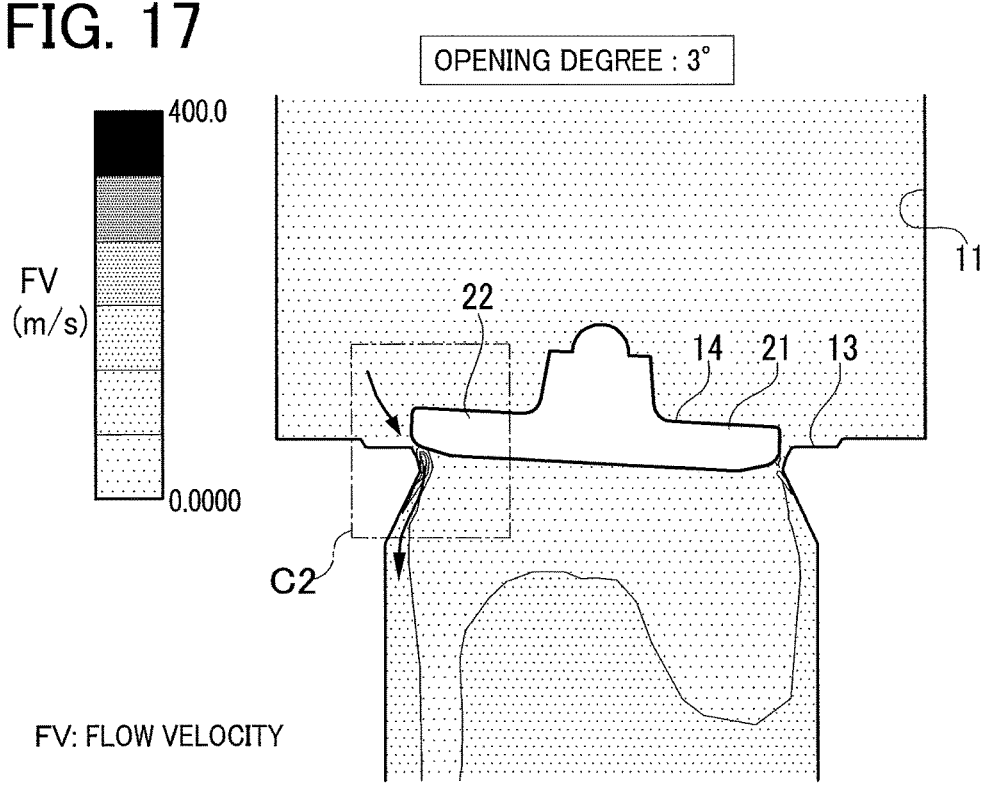
FIG. 17 is an explanatory view showing CAE analysis results of EGR gas flow velocity distribution when the opening degree of the valve element is 3° in the embodiment.
Figure 18:
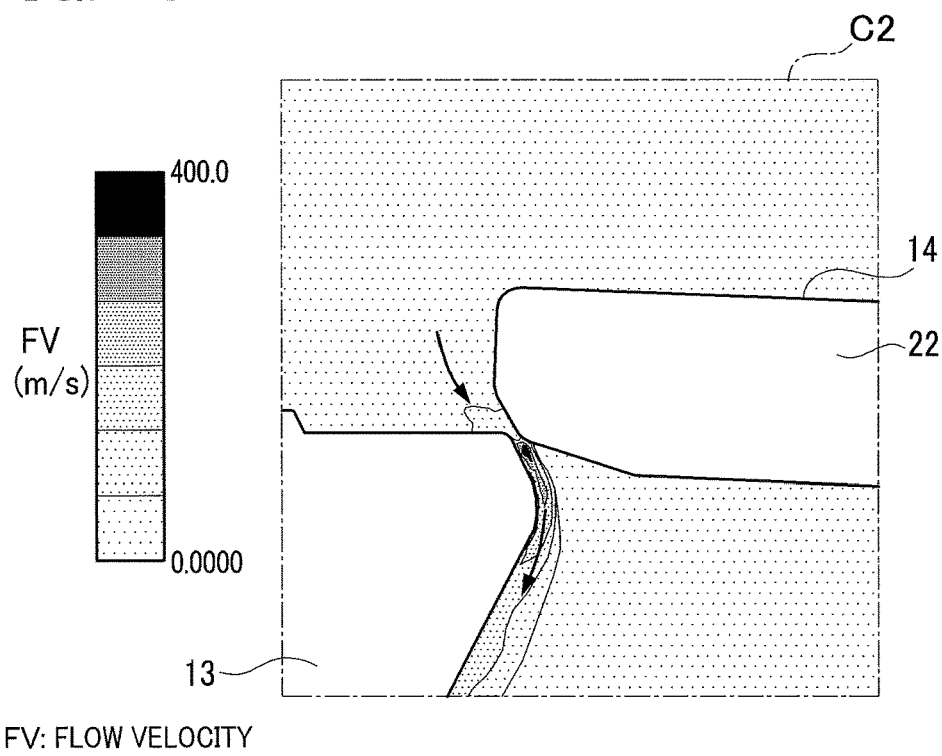
FIG. 18 is an enlarged view showing a region enclosed by a chain line rectangle in FIG. 17 in the embodiment.
Figure 19:
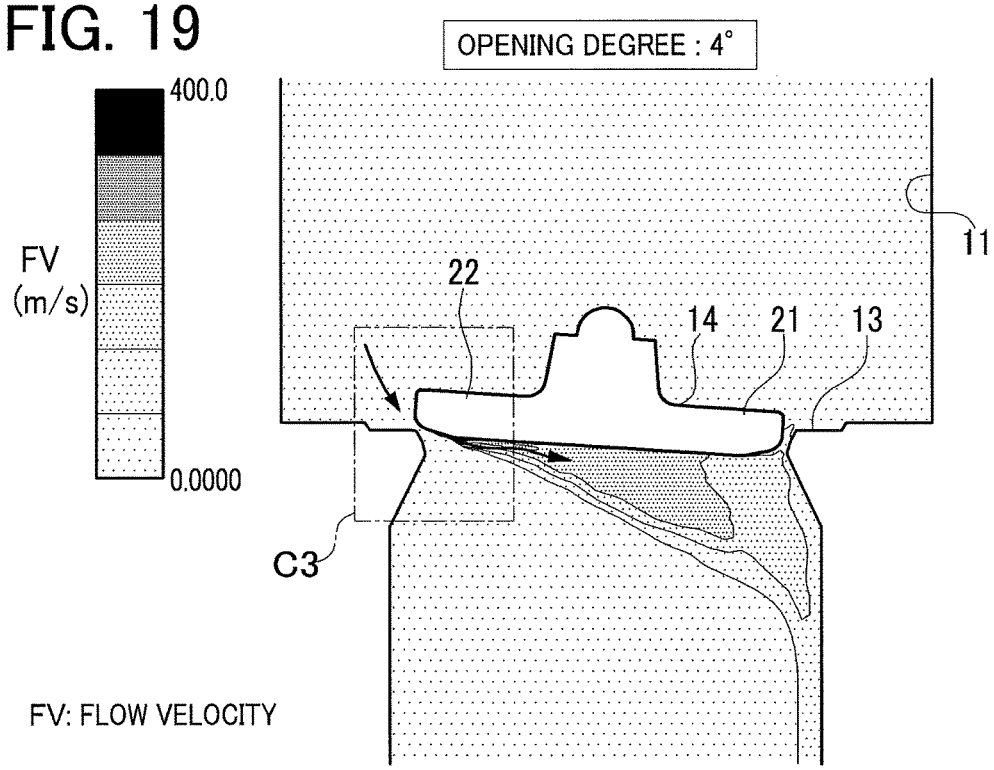
FIG. 19 is an explanatory view showing CAE analysis results of EGR gas flow velocity distribution when the opening degree of the valve element is 4° in the embodiment.
Figure 20:
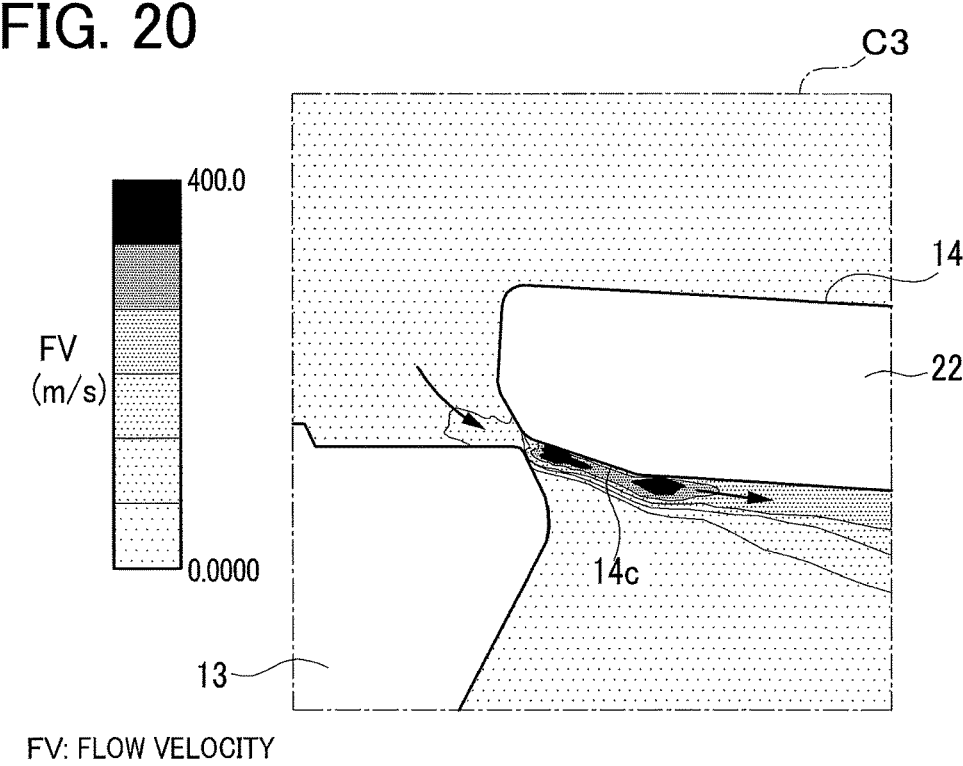
FIG. 20 is an enlarged view showing a region enclosed by a chain line rectangle in FIG. 19 in the embodiment.

Herein, this EGR valve 1 will be described below in relation to changes of EGR gas flow rate (flow characteristics) to the opening degree of the valve element 14. FIG. 15 is an explanatory view of CAE analysis results of EGR gas flow velocity distribution when the opening degree of the valve element 14 is 1°. FIG. 16 is an enlarged view of a region enclosed by a chain line rectangle C1 in FIG. 15. FIG. 17 is an explanatory view of CAE analysis results of EGR gas flow velocity distribution when the opening degree of the valve element 14 is 3°. FIG. 18 is an enlarged view of a region enclosed by a chain line rectangle C2 in FIG. 17. FIG. 19 is an explanatory view of CAE analysis results of EGR gas flow velocity distribution when the opening degree of the valve element 14 is 4°. FIG. 20 is an enlarged view of a region enclosed by a chain line rectangle C3 in FIG. 19. FIGS. 21 to 26 are explanatory views of CAE analysis results of EGR gas flow velocity distribution when the opening degree of the valve element 14 is 10°, 20°, 30°, 40°, 50°, and 60°, respectively. FIGS. 15 to 26 illustrate a central cross section, similar to FIG. 13. In FIGS. 15 to 26, darker hatching patterns represent higher flow velocities. FIGS. 27 to 37 are partially enlarged views respectively showing positional relationship between the valve seat 13 and the valve element 14 in relation to the first side part 21 and the second side part 22 when the valve element 14 is held at opening degrees of 0° (full closed), 1.0°, 2.0°, 3.0°, 4.0°, 5.0°, 6.0°, 7.0°, 8.0°, 9.0°, and 10.0°. FIGS. 27 to 37 are enlarged sectional views of right and left end portions of the valve seat 13 and the valve element 14 in FIG. 5.

As shown in FIGS. 15 to 26, when the valve element 14 rotates from the fully closed position in the valve opening direction, the second side part 22 of the valve element 14 rotates toward the outside of the valve hole 16. At that time, the first shortest distance G1 and the first passage area A1 formed by the outer periphery of the second side part 22 of the valve element 14 and the inner wall of the passage 11 will change in association with the rotation of the valve element 14 from respective initial values defined by the first shortest distance G1 and the first passage area A1 determined when the valve element 14 is in the fully closed position as shown in FIG. 14. Herein, as shown in FIGS. 15 to 26, the first shortest distance G1 and the first passage area A1 change at a low change rate until the valve element 14 is opened at a middle level of opening degree (about 40°) from the fully closed position, while change at a high change rate (an increase rate) from the middle level of opening degree to the fully open position. In contrast, the second shortest distance G2 and the second passage area A2 formed between the second side part 22 of the valve element 14 and the seat surface 17 of the valve seat 13 corresponding to the second side part 22 will increase, as shown in FIGS. 15 to 26, in association with the rotation of the valve element 14, from zero defined by the second shortest distance G2 and the second passage area A2 determined when the valve element 14 is in the fully closed position. In the present embodiment, the shapes and the sizes of the passage 11, the valve seat 13, and the valve element 14 are set so that the first shortest distance G1 is equal to or larger than the second shortest distance G2 while the first shortest distance G1 and the second shortest distance G2 are individually changing. In the present embodiment, the shaped and the sized of the passage 11, the valve seat 13, and the valve element 14 are also set so that the first passage area A1 is 1.3 times or more as large as the second passage area A2 while the first passage area A1 and the second passage area A2 are individually changing.

Figure 38:
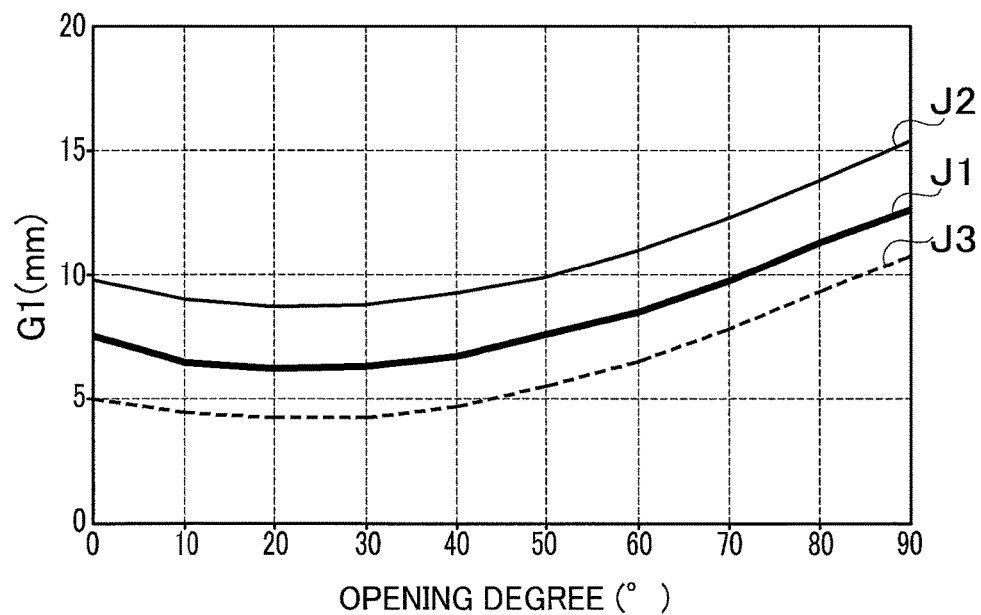
FIG. 38 is a graph showing a relationship of a first shortest distance to a rotation angle (opening degree) of the valve element in the present embodiment.
Figure 39:
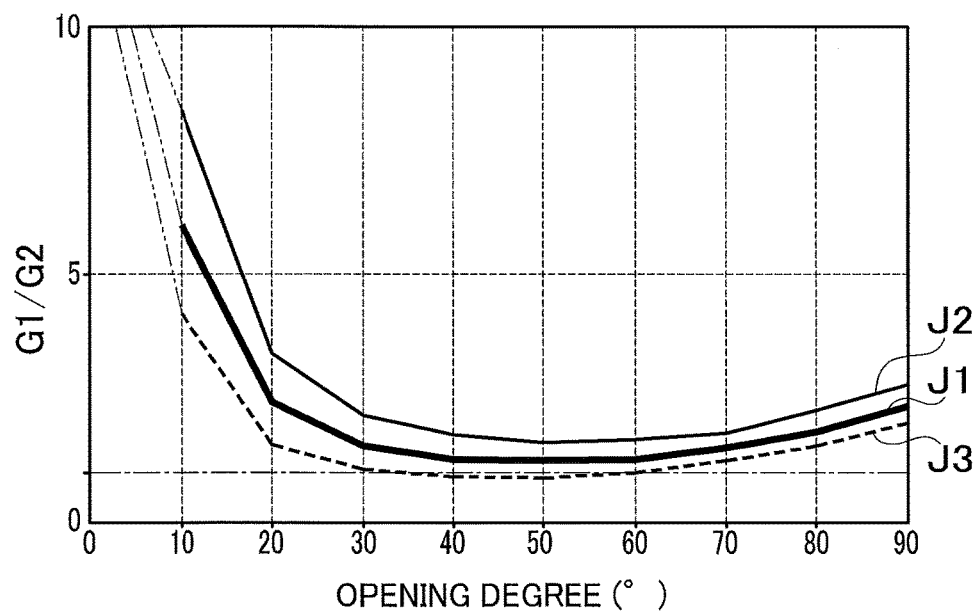
FIG. 39 is a graph showing a relationship of a distance ratio between the first shortest distance and a second shortest distance to the rotation angle (opening degree) of the valve element in the present embodiment.

Herein, FIG. 38 is a graph showing a relationship of the first shortest distance G1 to the rotation angle (opening degree) of the valve element 14 in the EGR valve 1 in the present embodiment. FIG. 39 is a graph showing a relationship of a distance ratio G1/G2 between the first shortest distance G1 and the second shortest distance G2 to the rotation angle (opening degree) of the valve element 14. In FIGS. 38 and 39, different types of lines represent differences in flow characteristics obtained when the largest diameter D2 of the seat surface 17 and the largest diameter D3 of the valve element 14 are set to fixed values and the inner diameter D1 of the passage 11 is set to different values in FIG. 13. Herein, a thick line J1 shows an example of the present embodiment in which the inner diameter D1 of the passage 11 is set to a predetermined value β in the present embodiment. A solid line J2 shows a comparative example in which the inner diameter D1 of the passage 11 is set to be larger by about 5 mm than the predetermined value β. A broken line J3 shows another comparative example in which the inner diameter of the passage is set to be smaller by about 5 mm than the predetermined value β. As indicated with the thick line J1 in FIG. 38, according to the present embodiment, it is revealed that the first shortest distance G1 becomes shorter than the initial value (about 7 mm) in the opening degree range from 0° to about 45° (a first opening degree range). Specifically, in this opening degree range, the second shortest distance G2 is conceived to gradually increase, but the first shortest distance G1 decreases to less than the initial value. Therefore, as shown in FIG. 39, in the first opening degree range, the distance ratio G1/G2 gradually decreases from an infinite value to a lowest value. In an opening degree range of about 45° and to 90° (a second opening degree range), the distance ratio G1/G2 gradually increases from the lowest value. In the present embodiment, however, since the first shortest distance G1 is set to be equal to or larger than the second shortest distance G2, it is found that the distance ratio G1/G2 does not become 1.0 or less over the entire open range of 0° to 90°. In the comparative example indicated with the solid line J2 in FIG. 39, similarly, it is also found that the distance ratio G1/G2 does not become 1.0 or less over the entire open range of 0° to 90°. In contrast, in the comparative example indicated with the broken line J3 in FIG. 39, it is revealed that distance ratio G1/G2 decreases to 1.0 or less in the opening degree range from about 30° to about 60°. Specifically, the first shortest distance G1 becomes smaller than the second shortest distance G2. It is conceived that a similar tendency to the above is also present between the first passage area A1 and the second passage area A2.

In the present embodiment, consequently, while the valve element 14 rotates from the fully closed position in the valve opening direction, the first shortest distance G1 does not become shorter than the second shortest distance G2, and the first passage area A1 does not become shorter than the second passage area A2. Therefore, the flow rate of EGR gas allowed to flow between the second side part 22 and the valve seat 13 is not limited due to the gap and the passage area formed between the inner wall of the passage 11 and the outer periphery of the second side part 22 of the valve element 14. Further, since the first passage area A1 is 1.3 times or more as large as the second passage area A2, the first passage area A1 is provided to be sufficiently wide as compared with the second passage area A2. Therefore, the EGR valve 1 in the present embodiment can achieve appropriate flow characteristics according to changes in the opening degree of the valve element 14 from the fully closed position. Regarding the first side part 21 of the valve element 14, this first side part 21 is rotated in the opposite direction to the second side part 22, so that a flow of EGR gas in the passage 11 upstream of the valve element 14 is not limited by the valve element 14.

Figure 40:
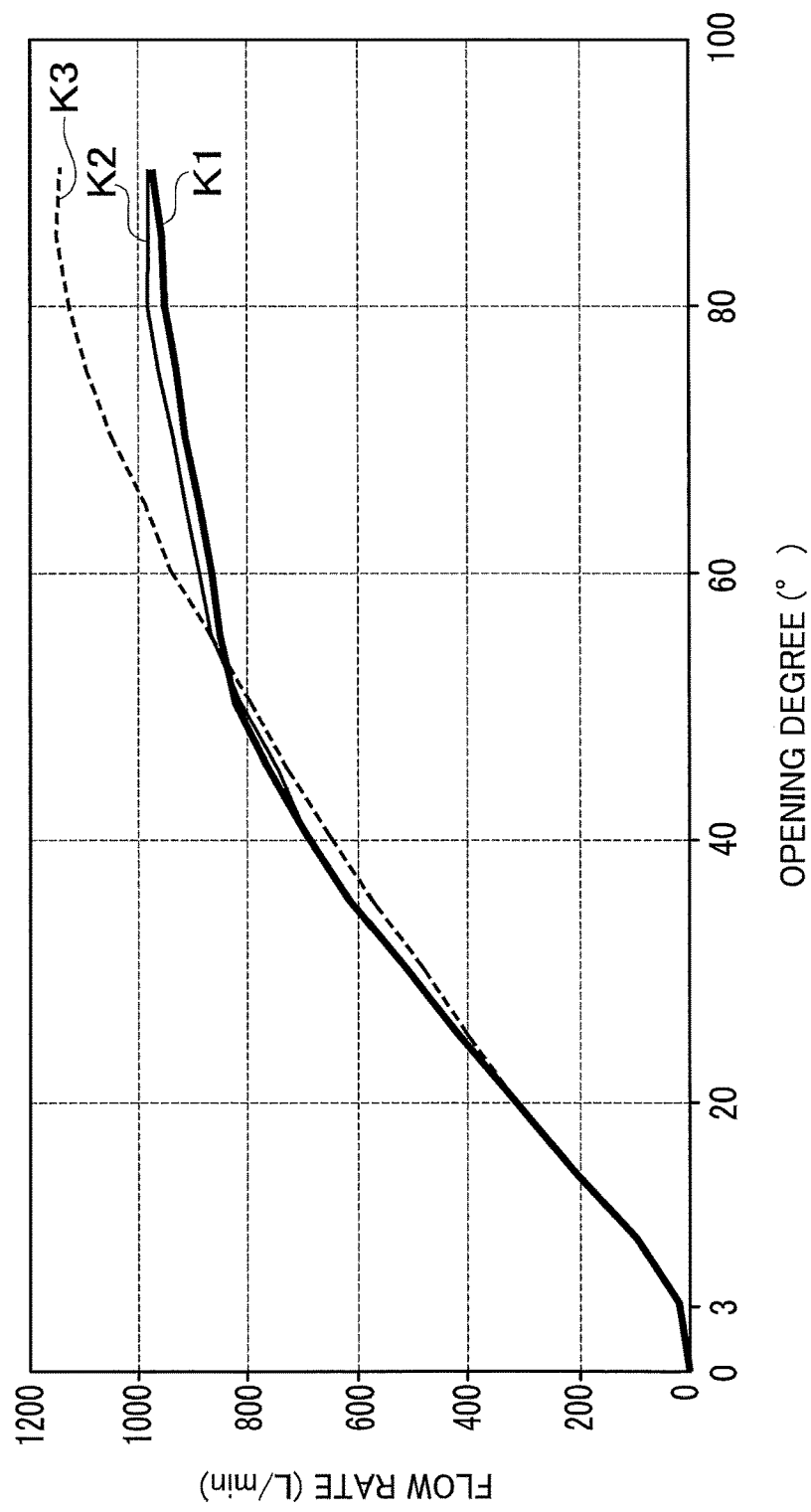
FIG. 40 is a graph showing changes in EGR gas flow (flow characteristics) to the opening degree of the valve element in the embodiment.

FIG. 40 is a graph showing flow rate changes (flow characteristics) of EGR gas with respect to the opening degree of the valve element 14 in the foregoing EGR valve 1. In FIG. 40, different types of lines represent differences in flow rate obtained when the largest diameter D2 of the seat surface 17 and the largest diameter D3 of the valve element 14 are set to fixed values and the inner diameter D1 of the passage 11 is set to different values in FIG. 13. A thick line K1 shows an example of the present embodiment in which an area ratio of the first passage area A1 to the second passage area A2 is about 2.9 times. A solid line K2 shows a first comparative example in which the area ratio is about 2.0 times. A broken line K3 shows a second comparative example in which the area ratio is about 0.85 times. As indicated by the thick line K1 and the solid like K2 in FIG. 40, in the present embodiment and the first comparative example, the flow rate slightly increases when the opening degree of the valve element 14 is in a slight opening degree range from 0° to about 3°, the flow rate rapidly increases in a low opening degree range from about 3° to about 20°, the flow rate slowly slightly increases in a middle opening degree range from about 20° to about 50°, and the flow rate slowly increases in a middle-high opening degree range from about 50° to 90°. As is clear from this graph, it is revealed that the present embodiment and the first comparative example respectively having the area ratio of about 2.9 times and the area ratio of about 2.0 times, the flow rate in the middle opening degree range from about 25° to about 55° is larger than that in the second comparative example having the area ratio of about 0.85 times. In the present embodiment, as described above, the EGR gas flow characteristics can be optimized.

In the present embodiment, furthermore, the valve element 14 is formed, between the sealing surface 18 and the bottom surface 14c, with the tapered surface 14d inclined from the innermost edges 18c and 18d of the sealing surface 18 to the bottom surface 14c. Accordingly, when the valve element 14 comes to the low opening degree, the EGR gas allowed to flow between the seat surface 17 of the valve hole 16 and the valve element 14 is guided along this tapered surface 14d to smoothly flow downstream with reduced variation in EGR gas flow rate. This can make it possible to stabilize the flow characteristics in the low flow rate region of EGR gas and thus reduce variations in entire flow characteristics.

Figure 21:
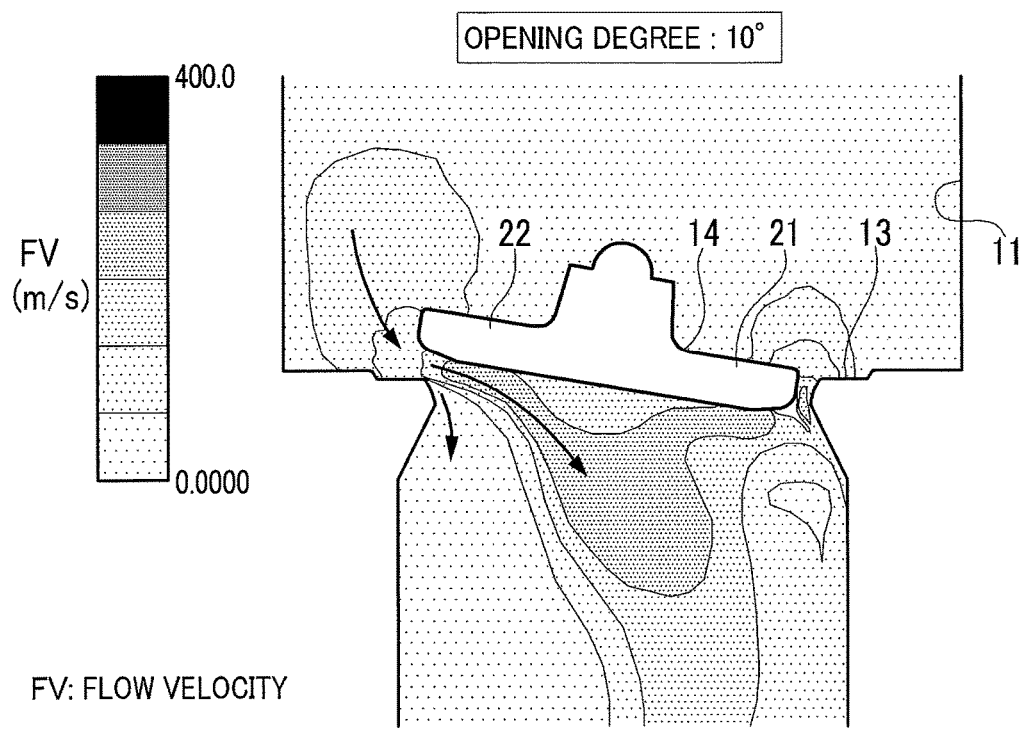
FIG. 21 is an explanatory view showing CAE analysis results of EGR gas flow velocity distribution when the opening degree of the valve element is 10° in the embodiment.
Figure 22:
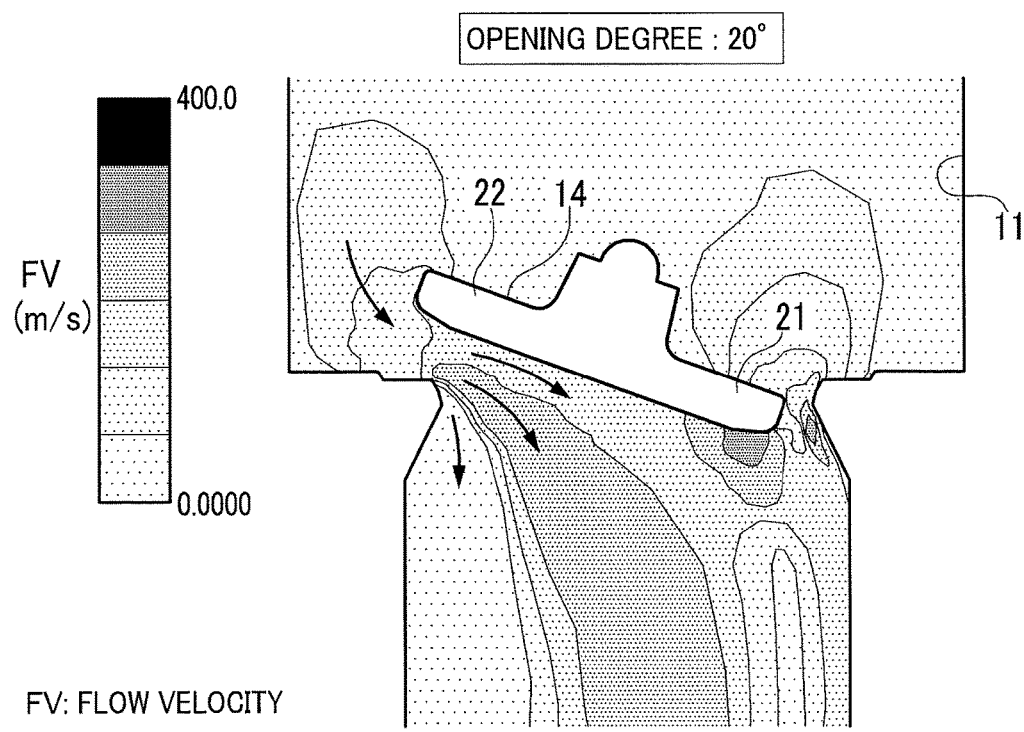
FIG. 22 is an explanatory view showing CAE analysis results of EGR gas flow velocity distribution when the opening degree of the valve element is 20° in the embodiment.
Figure 23:
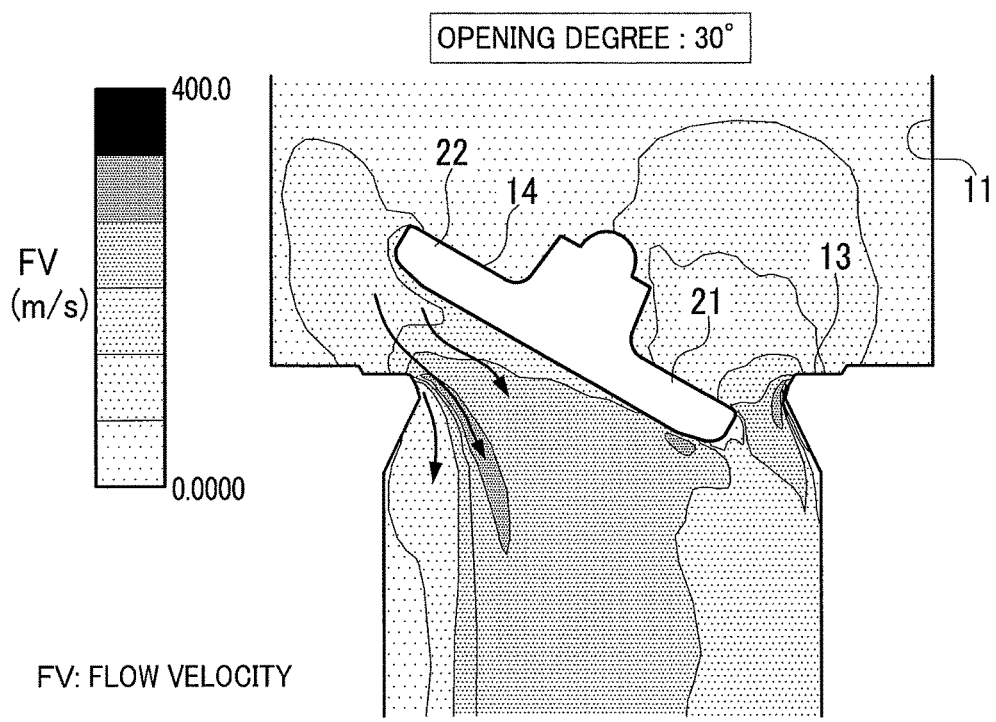
FIG. 23 is an explanatory view showing CAE analysis results of EGR gas flow velocity distribution when the opening degree of the valve element is 30° in the embodiment.
Figure 24:
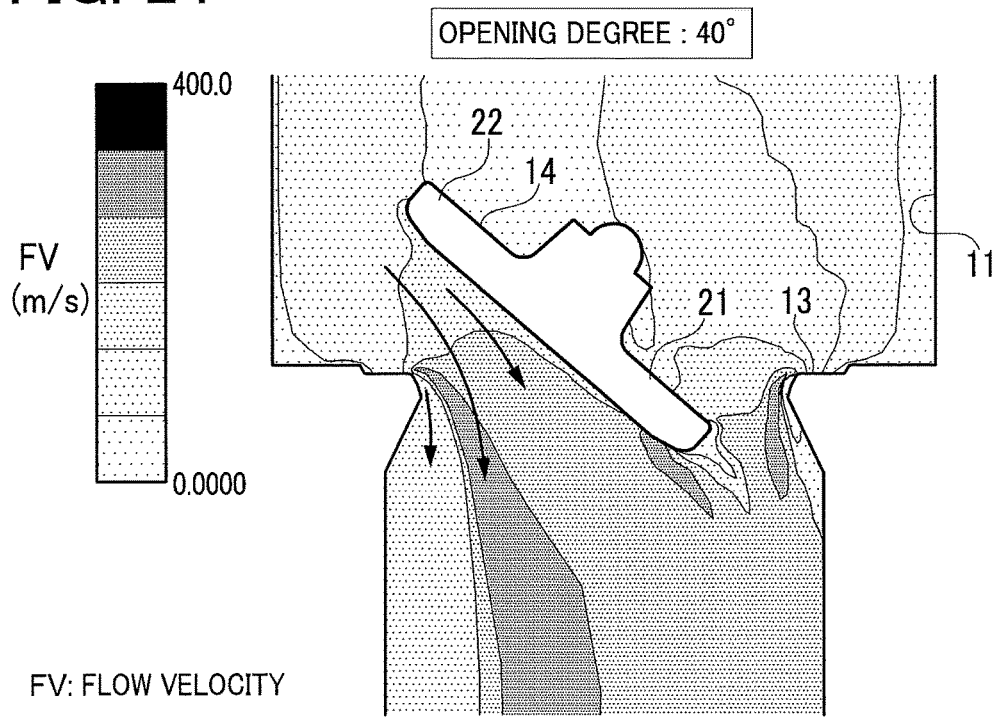
FIG. 24 is an explanatory view showing CAE analysis results of EGR gas flow velocity distribution when the opening degree of the valve element is 40° in the embodiment.
Figure 25:
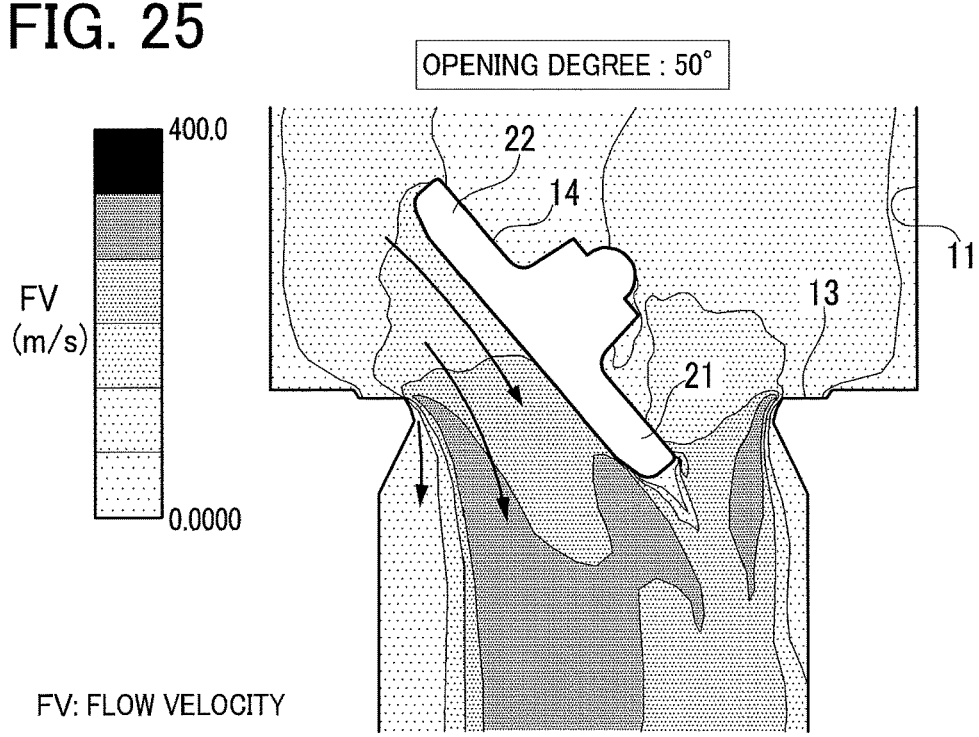
FIG. 25 is an explanatory view showing CAE analysis results of EGR gas flow velocity distribution when the opening degree of the valve element is 50° in the embodiment.
Figure 26:
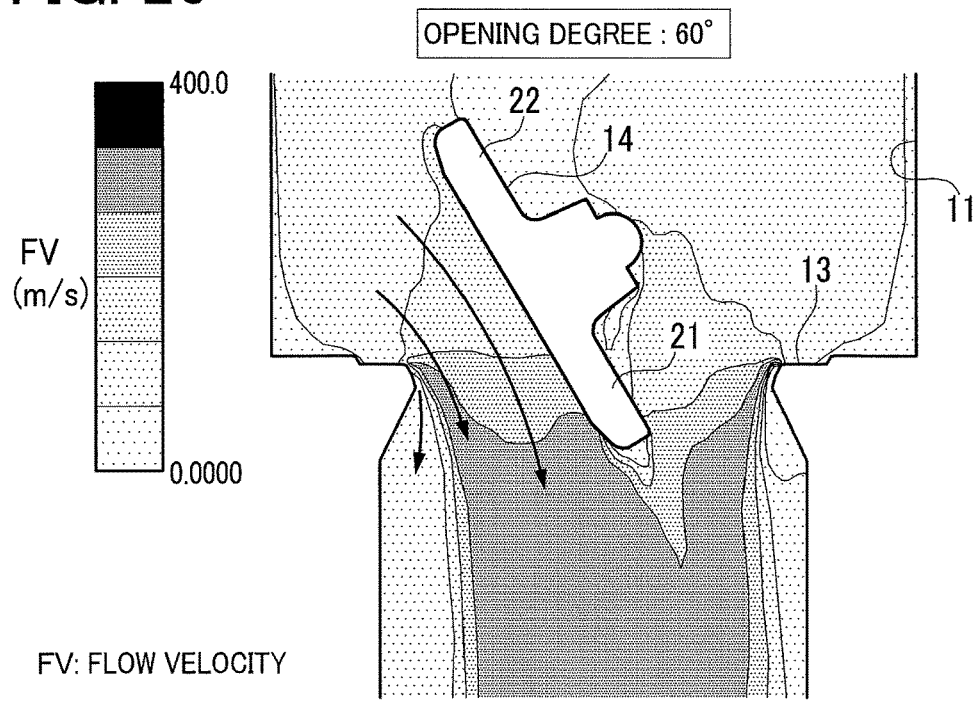
FIG. 26 is an explanatory view showing CAE analysis results of EGR gas flow velocity distribution when the opening degree of the valve element is 60° in the embodiment.
Figure 27:
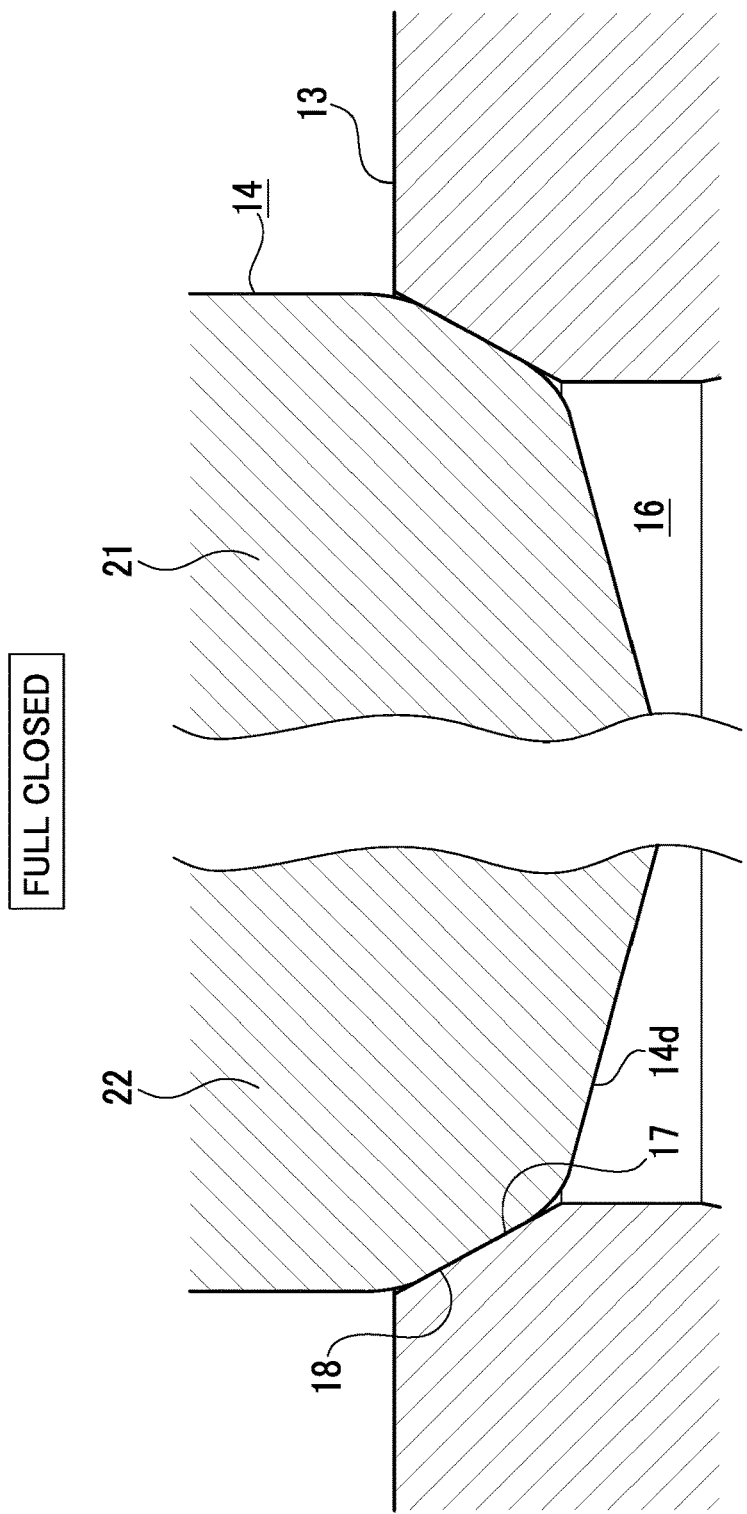
FIG. 27 is a partially enlarged view showing a positional relationship between the valve seat and the valve element in relation to a first side part and a second side part when the opening degree of the valve element is 0° (full closed) in the embodiment.
Figure 28:
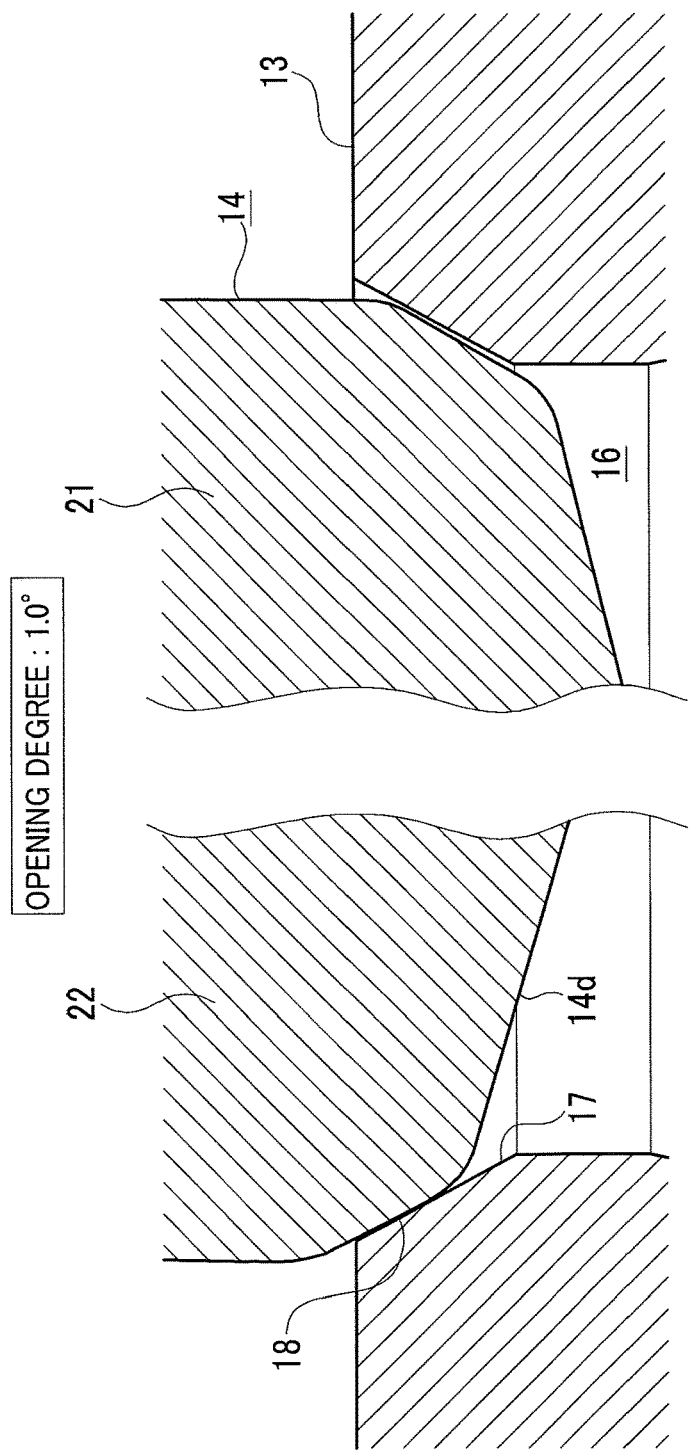
FIG. 28 is a partially enlarged view showing a positional relationship between the valve seat and the valve element in relation to the first side part and the second side part when the opening degree of the valve element is 1.0° in the embodiment.
Figure 29:
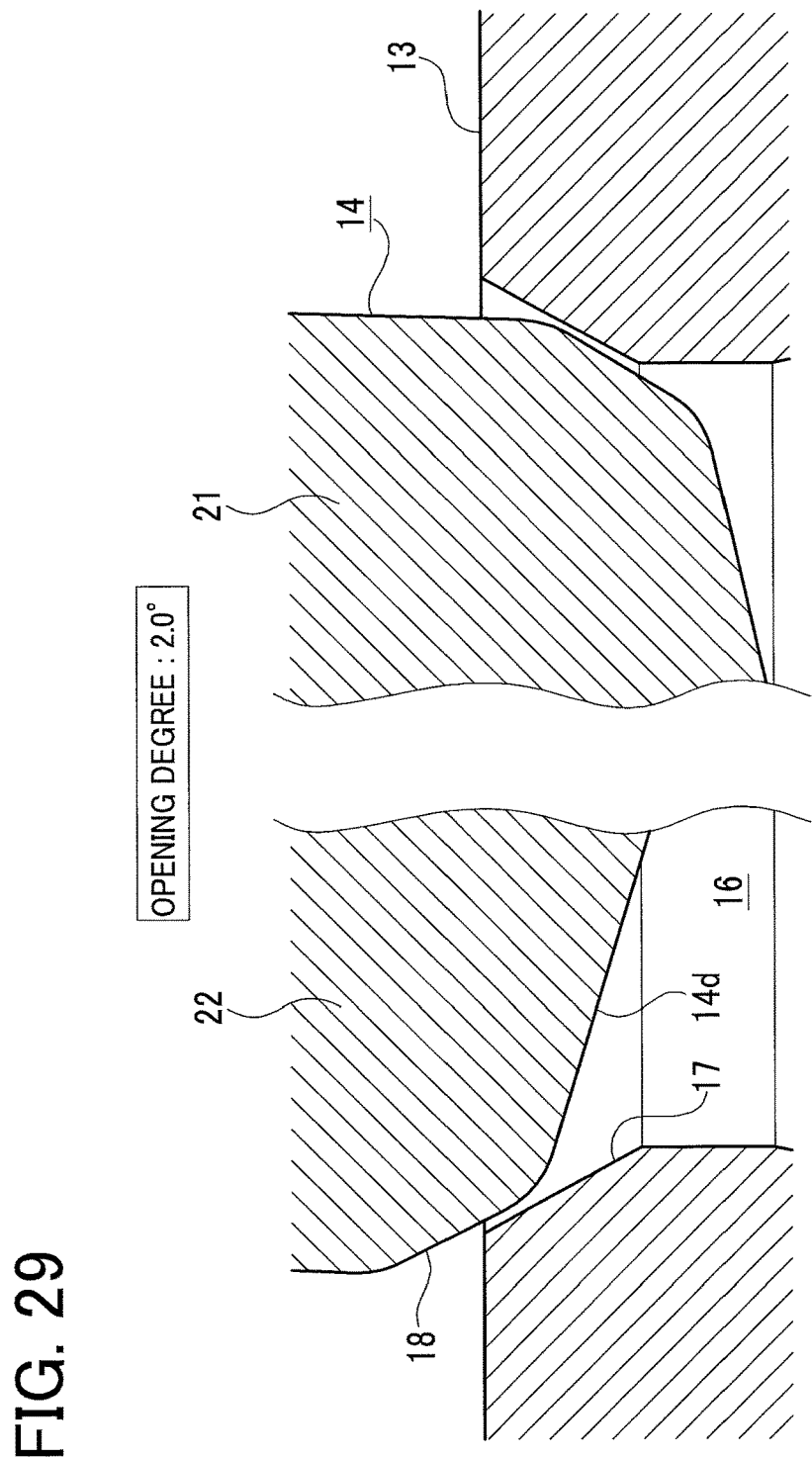
FIG. 29 is a partially enlarged view showing a positional relationship between the valve seat and the valve element in relation to the first side part and the second side part when the opening degree of the valve element is 2.0° in the embodiment.
Figure 30:
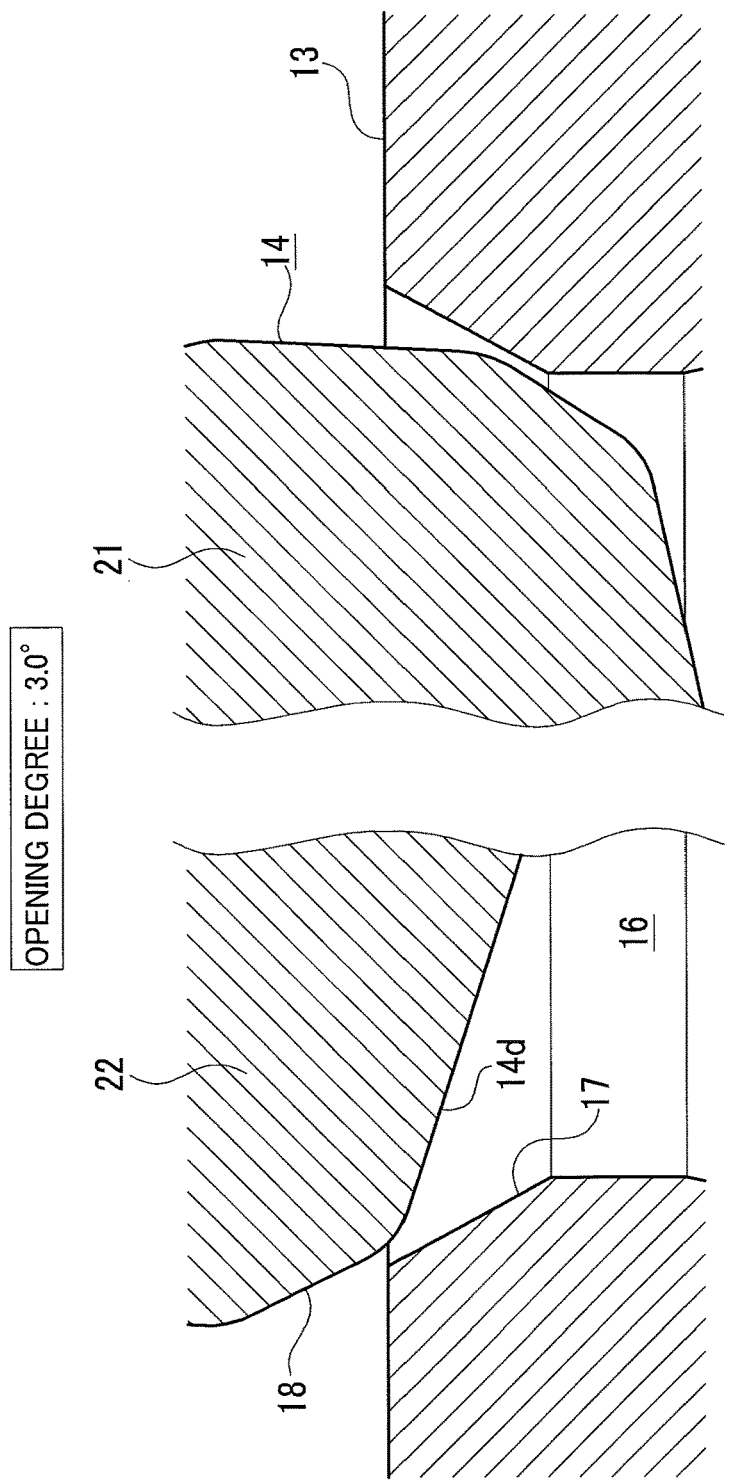
FIG. 30 is a partially enlarged view showing a positional relationship between the valve seat and the valve element in relation to the first side part and the second side part when the opening degree of the valve element is 3.0° in the embodiment.
Figure 31:
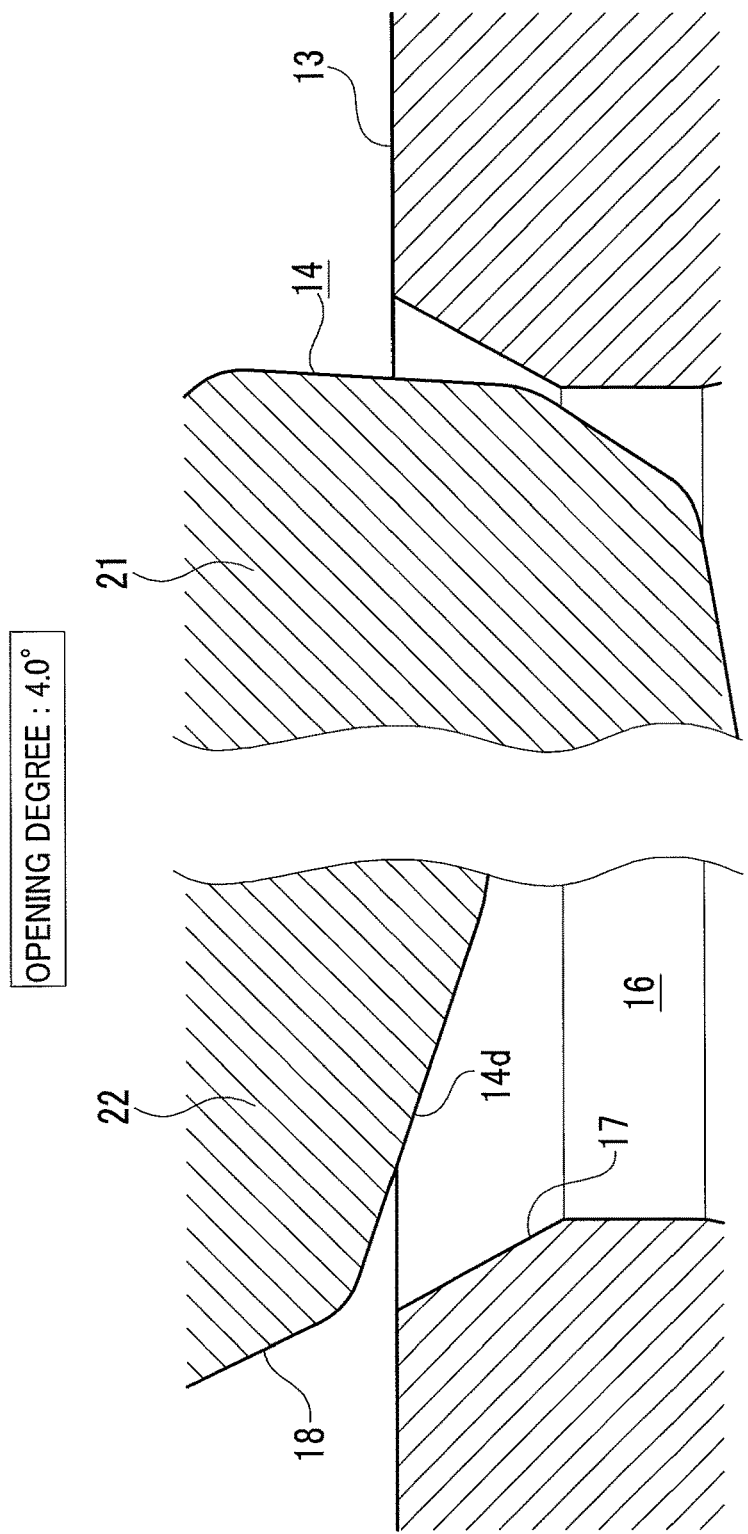
FIG. 31 is a partially enlarged view showing a positional relationship between the valve seat and the valve element in relation to the first side part and the second side part when the opening degree of the valve element is 4.0° in the embodiment.
Figure 32:
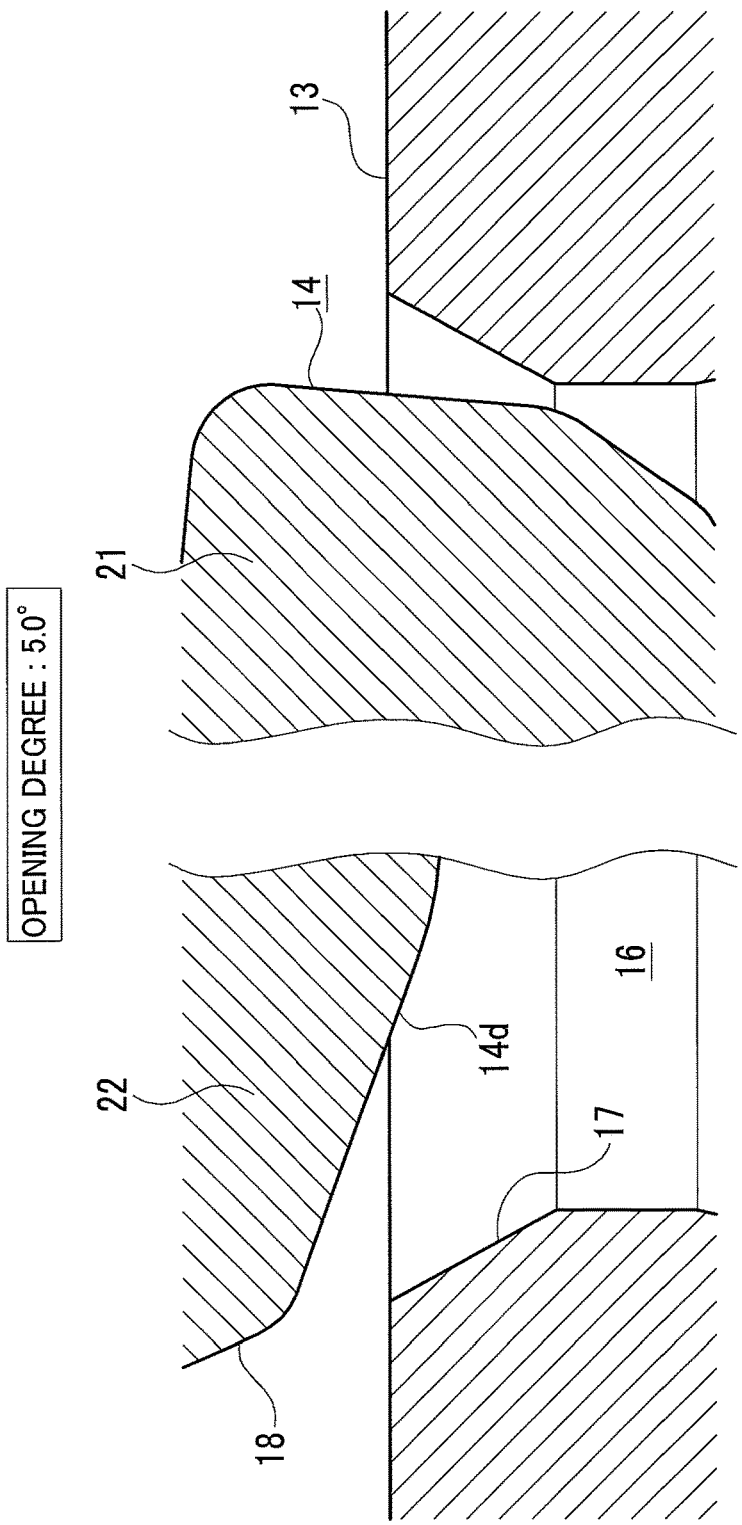
FIG. 32 is a partially enlarged view showing a positional relationship between the valve seat and the valve element in relation to the first side part and the second side part when the opening degree of the valve element is 5.0° in the embodiment.
Figure 33:
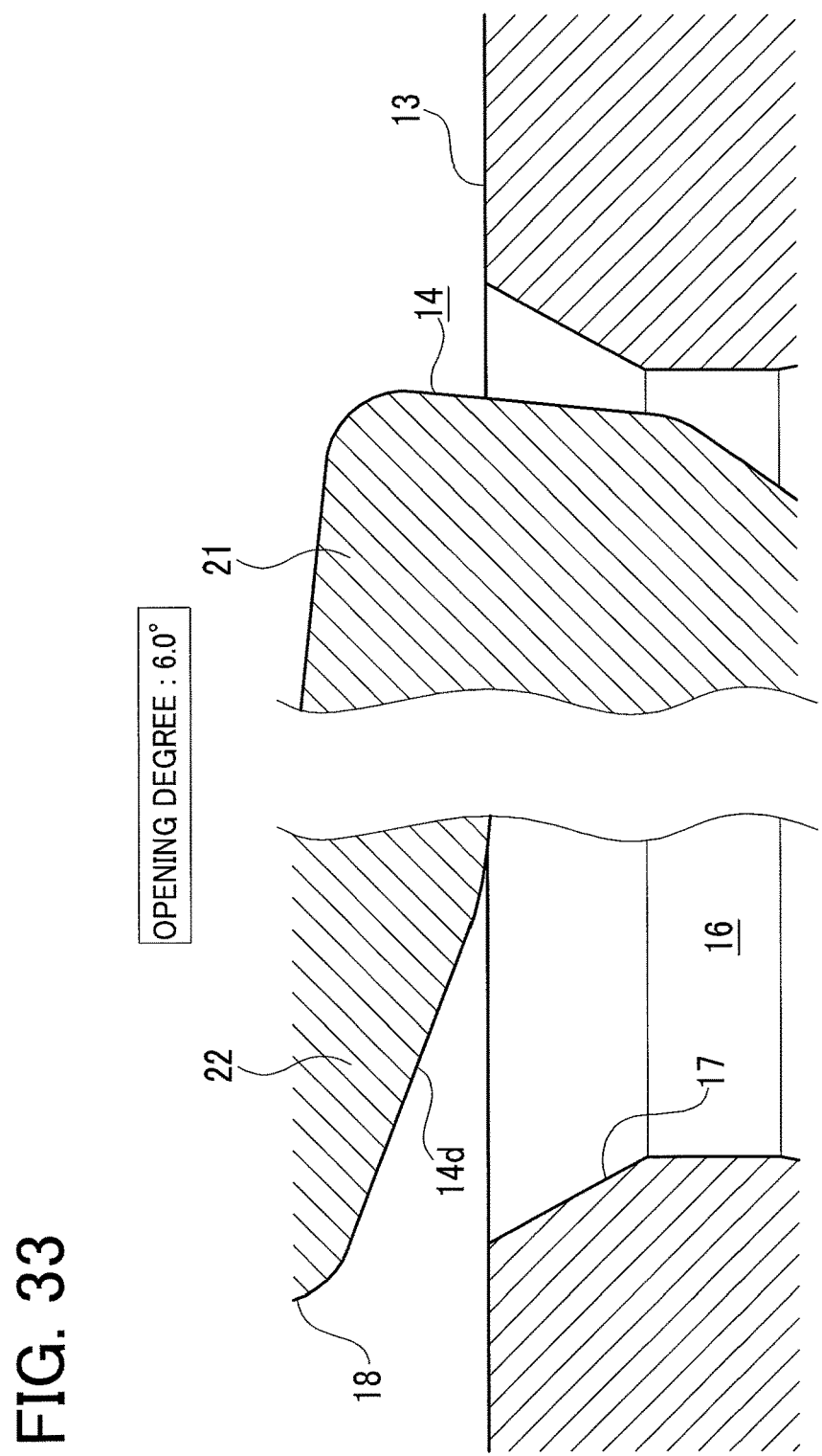
FIG. 33 is a partially enlarged view showing a positional relationship between the valve seat and the valve element in relation to the first side part and the second side part when the opening degree of the valve element is 6.0° in the embodiment.
Figure 34:
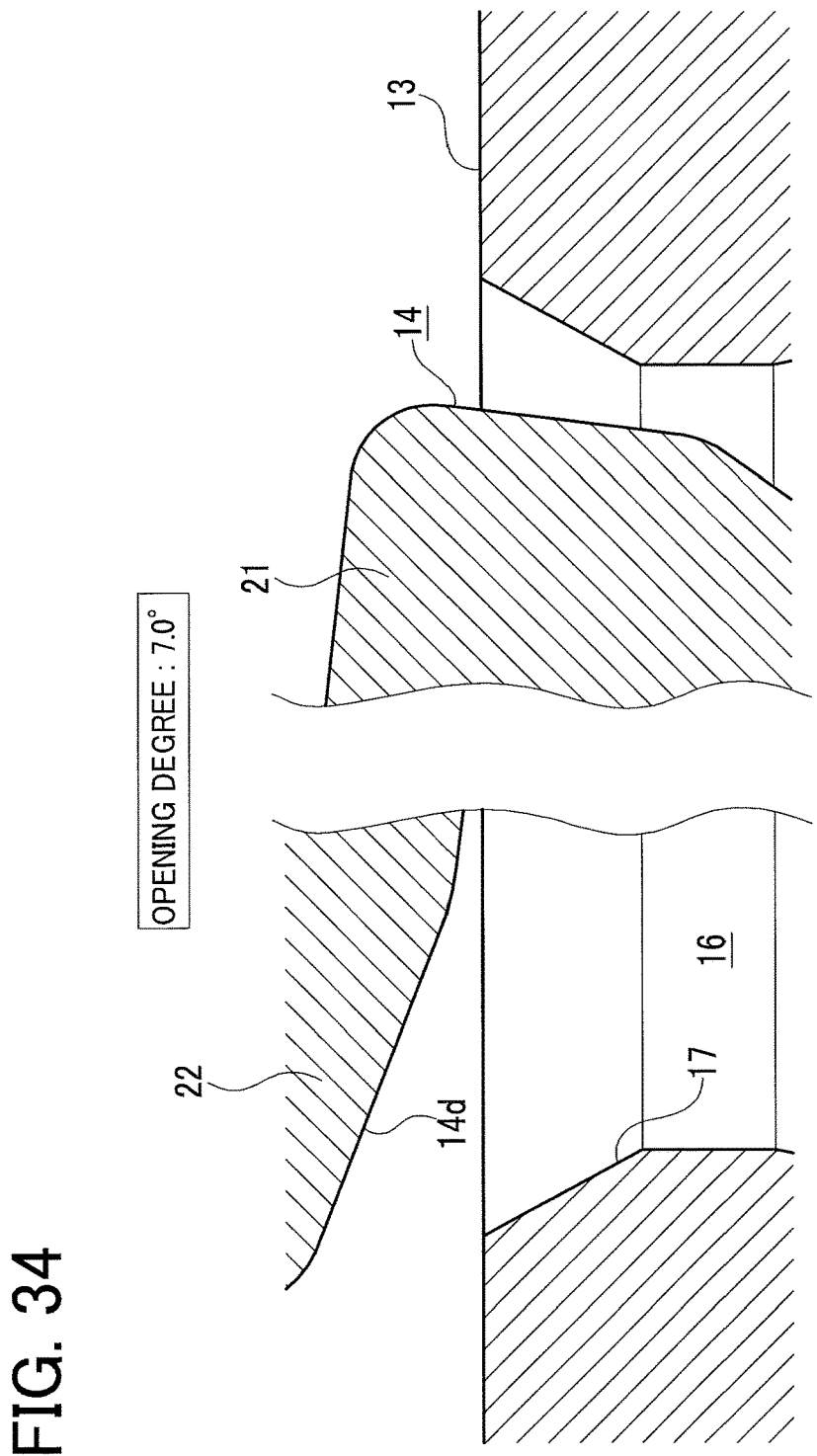
FIG. 34 is a partially enlarged view showing a positional relationship between the valve seat and the valve element in relation to the first side part and the second side part when the opening degree of the valve element is 7.0° in the embodiment.
Figure 35:
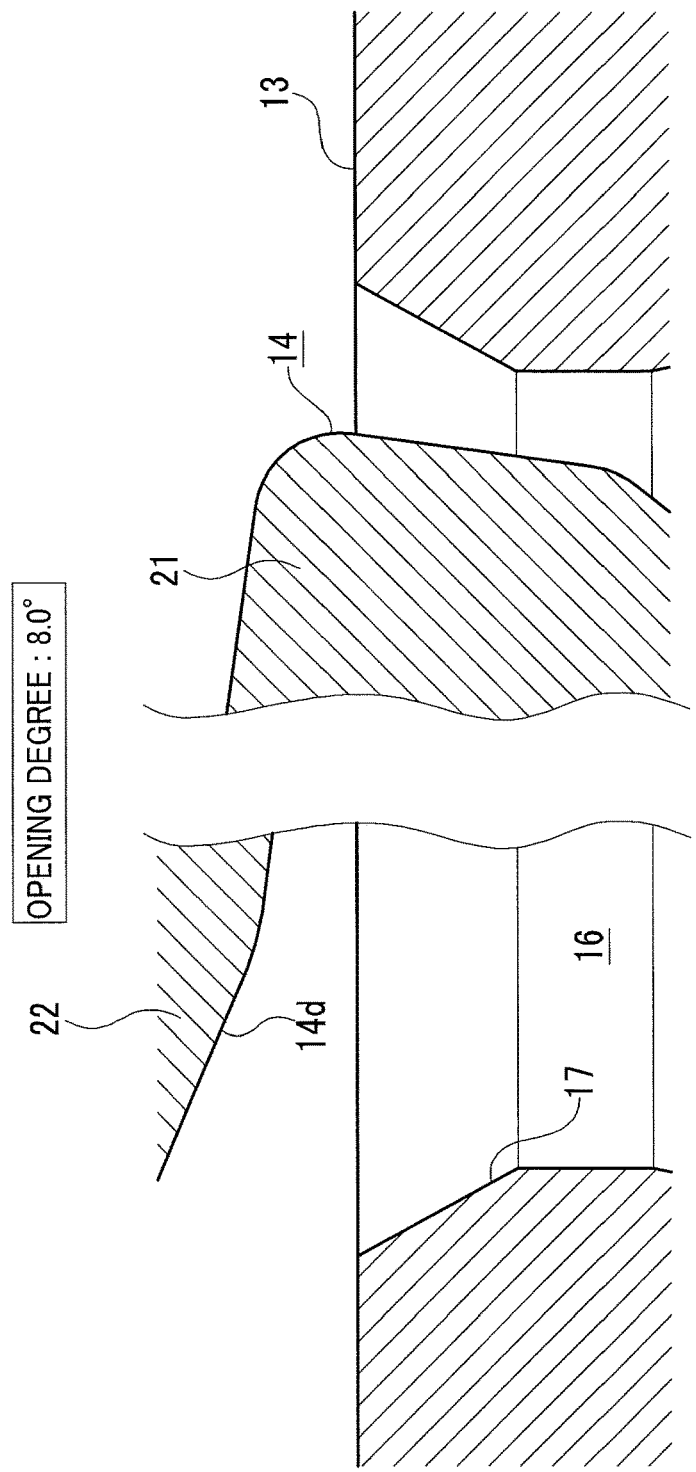
FIG. 35 is a partially enlarged view showing a positional relationship between the valve seat and the valve element in relation to the first side part and the second side part when the opening degree of the valve element is 8.0° in the embodiment.
Figure 36:
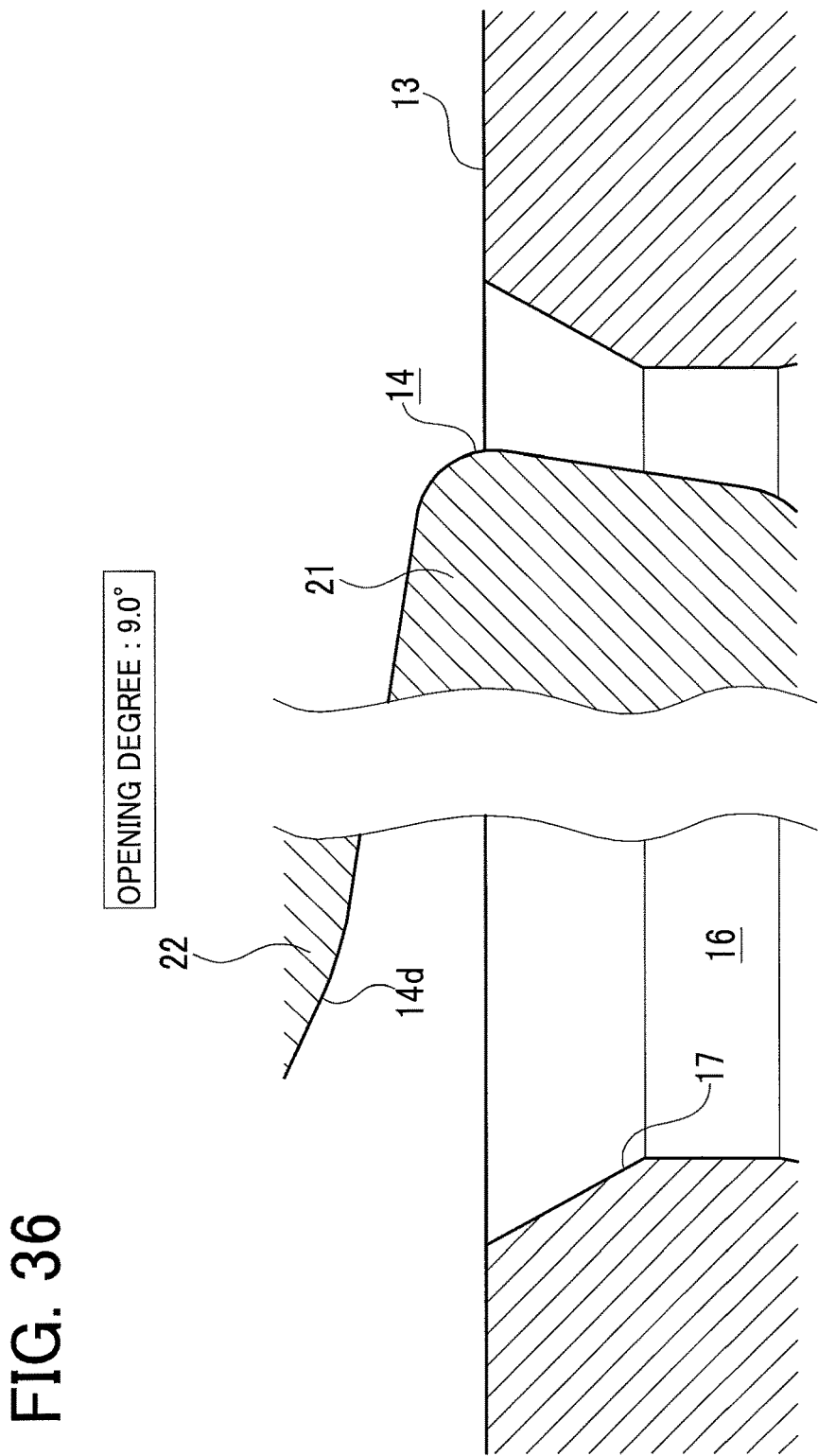
FIG. 36 is a partially enlarged view showing a positional relationship between the valve seat and the valve element in relation to the first side part and the second side part when the opening degree of the valve element is 9.0° in the embodiment.
Figure 37:
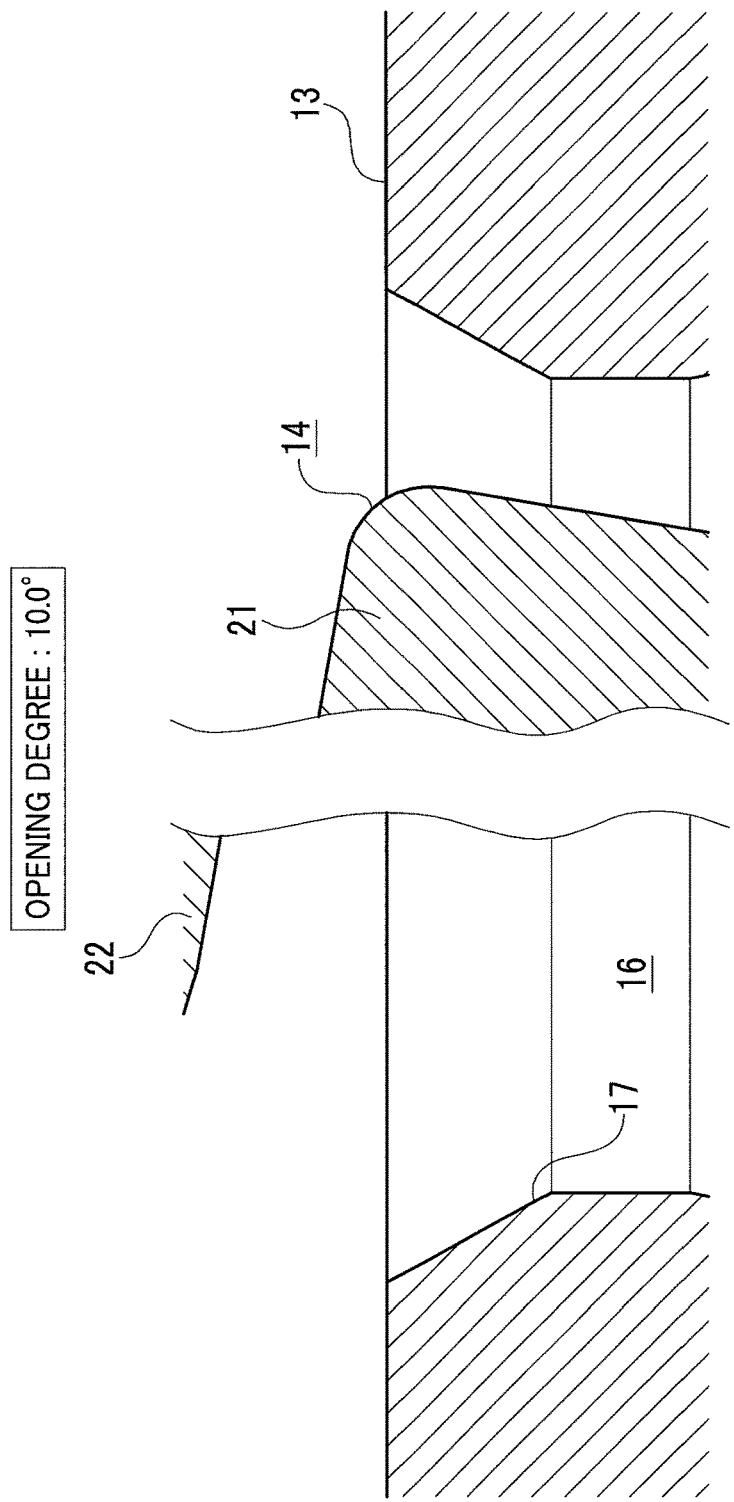
FIG. 37 is a partially enlarged view showing a positional relationship between the valve seat and the valve element in relation to the first side part and the second side part when the opening degree of the valve element is 10.0° in the embodiment.

For example, in the low opening degree range in which the opening degree of the valve element 14 is about 4° to about 10°, as is seen from FIGS. 19 to 21, EGR gas allowed to flow between the valve seat 13 and the valve element 14 flows along the tapered surface 14d of the valve element 14 toward the center of a downstream side of the passage 11.

This is conceivably because in the low opening degree range of 0° to about 10°, as shown in FIGS. 31 to 37, the tapered surface 14d of the second side part 22 of the valve element 14 faces the seat surface 17 of the valve seat 13.

The present invention is not limited to the foregoing embodiment and may be embodied in other specific forms without departing from the essential characteristics thereof.

In the foregoing embodiment, the valve element 14 including the fixed part 14b is formed in the symmetric shape with respect to the axis L2 of the valve element 14. As an alternative, the fixed part may be formed in a position eccentric from the axis of the valve element so that the valve element has a asymmetric shape with respect to the axis of the valve element.

INDUSTRIAL APPLICABILITY

The present invention is applicable to a flow control valve for controlling a fluid flow as well as an EGR valve.

REFERENCE SIGNS LIST

1 EGR valve
2 Valve section
11 Passage
13 Valve seat
14 Valve element
14a Plate surface
14b Fixed part
14c Bottom surface
14d Taper surface
15 Rotary shaft
15a Pin
16 Valve hole
17 Seat surface
18 Seal surface
18a Outermost edge (of first side part)
18b Outermost edge (of second side part)
18c Innermost edge (of first side part)
18d Innermost edge (of second side part)
21 First side part
22 Second side part
L1 Axis of rotary shaft
L2 Axis of valve element
L3 Central axis of valve hole
P1 Center of valve hole
T1 Rotation path of sealing surface (of first side part)
T2 Rotation path of sealing surface (of second side part)
T1a Rotation path of outermost edge (of first side part)
T2a Rotation path of outer lost edge (of second side part)
T1b Rotation path of innermost edge (of first side part)
T2b Rotation path of innermost edge (of second side part)
V1 Virtual plane
γ Optimal open angle of sealing surface
γS First open angle
γL Second open angle
CS Length of first line (to outermost edge of first side part)
CL Longest distance (to outermost edge of second side part)
a Offset amount
b Offset amount
D Maximum outer diameter of sealing surface
t Thickness of sealing surface in axial direction
A1 First passage area
A2 Second passage area

The invention claimed is:

1. A double eccentric valve comprising:
a valve seat including a valve hole and an annular seat surface formed on an edge of the valve hole;
a valve element having a circular disc shape and including an annular sealing surface formed on an outer periphery, the sealing surface corresponding to the seat surface;
a passage allowing a fluid to flow through, the valve seat and the valve element being placed in the passage; and
a rotary shaft to rotate the valve element, wherein:
the rotary shaft has an axis extending in parallel to a radial direction of the valve element and the valve hole, the axis being positioned eccentrically from a center of the valve hole in a radial direction of the valve hole,
the sealing surface is positioned eccentrically from the axis of the rotary shaft toward an extending direction of an axis of the valve element, so that the valve element is configured to rotate about the axis of the rotary shaft between a fully closed position where the sealing surface is in surface contact with the seat surface and a fully open position where the sealing surface is furthest away from the seat surface,
the valve element is partitioned into a first side part and a second side part with respect to a boundary defined by a virtual plane extending from the axis of the rotary shaft and parallel to an extending direction of a central axis of the valve hole,
the sealing surface includes an outermost edge which will contact with the seat surface at a position close to an outer periphery of the seat surface and an innermost edge which will contact with the seat surface at a position close to an inner periphery of the seat surface,
the valve element is configured such that, when the valve element rotates from the fully closed position in the valve opening direction, the first side part is rotated toward inside of the valve hole and the second side part is rotated toward outside of the valve hole, and the outermost edge and the innermost edge of the sealing surface are respectively rotated along rotation paths about the axis of the rotary shaft,
the seat surface is inclined toward the center of the valve hole so that an angle of the seat surface circumscribing the rotation path of the outermost edge of the sealing surface of the first side part in the fully closed position is a maximum value and an angle of the seat surface circumscribing the rotation path of the innermost edge of the sealing surface of the second side part is a minimum value, and
in a central cross section of the passage, the valve seat, and the valve element taken along a line passing through a center of the passage and the valve seat and extending in a direction perpendicular to the axis of the rotary shaft,
when a first shortest distance is defined by a shortest distance of a gap to be formed between an outer periphery of the second side part of the valve element and an inner wall of the passage when the valve element rotates from the fully closed position in the valve opening direction and a second shortest distance is defined by a shortest distance of a gap to be formed between the second side part and the seat surface of the valve seat corresponding to the second side part when the valve element rotates from the fully closed position in the valve opening direction,
the passage, the valve seat, and the valve element have shapes and sizes designed so that the first shortest distance is equal to or larger than the second shortest distance over an entire rotation range of the valve element.

2. The double eccentric valve according to claim 1, wherein the valve element includes a flat bottom surface on a side facing the valve hole, and a tapered surface located between the sealing surface and the bottom surface, the tapered surface being inclined from the sealing surface toward the bottom surface.

3. The double eccentric valve according to claim 2, wherein the valve element includes a joining portion joining the innermost edge of the sealing surface to the tapered surface, and the joining portion is an outwardly protruding curved-surface.

4. The double eccentric valve according to claim 1, wherein each of the seat surface and the sealing surface has a uniform shape over an entire circumference.

5. The double eccentric valve according to claim 1, wherein
the valve element includes a fixed part protruding from a plate surface of the valve element and being fixed to the rotary shaft, the fixed part being attached to the rotary shaft in a position displaced from the axis of the rotary shaft in a radial direction of the rotary shaft, and
the fixed part is placed on the axis of the valve element, and the valve element including the fixed part has a symmetric shape with respect to the axis of the valve element.

6. The double eccentric valve according to claim 1, wherein the valve element is placed on a more upstream side in the passage than the valve seat.

7. The double eccentric valve according to claim 1, wherein
in a state where a first line extending at a shortest distance from the axis of the rotary shaft to the outermost edge of the sealing surface of the first side part intersects with the sealing surface, a first open angle γS of the sealing surface is determined by a following equation (1):

$$\gamma S = 2 * \arccos((D/2-a)/CS)[\text{rad}] \tag{1}$$

where CS is a length of the first line, a is an offset amount of the rotary shaft offset from the central axis of the valve hole in the radial direction of the valve hole, and D is a largest diameter of the sealing surface, and
in a case where a second line extending at a longest distance from the axis of the rotary shaft to the innermost edge of the sealing surface of the second side part intersects with the sealing surface,
a second open angle γL of the sealing surface is determined by following equations (2) and (3):

$$\gamma L = \arcsin((f/2+t)/(CL/2)) + \arctan(f/(D/2+a))[\text{rad}] \tag{2}$$

$$f = b - t/2 \tag{3}$$

where CL is a longest distance from the axis of the rotary shaft to the outermost edge of the sealing surface of the second side part, b is an offset amount of the rotary shaft from the center of the valve hole in a direction of the axis of the valve element, and t is a thickness of the sealing surface in an axial direction, and
an optimal open angle γ of the sealing surface is set to meet a condition of a following equation (4):

$$\gamma L \leq \gamma \leq \gamma S \tag{4}$$

8. A double eccentric valve comprising:
a valve seat including a valve hole and an annular seat surface formed on an edge of the valve hole;
a valve element having a circular disc shape and including an annular sealing surface formed on an outer periphery, the sealing surface corresponding to the seat surface;
a passage allowing a fluid to flow through, the valve seat and the valve element being placed in the passage; and
a rotary shaft to rotate the valve element, wherein:
the rotary shaft has an axis extending in parallel to a radial direction of the valve element and the valve hole, the axis being positioned eccentrically from a center of the valve hole in a radial direction of the valve hole,
the sealing surface is positioned eccentrically from the axis of the rotary shaft toward an extending direction of an axis of the valve element, so that the valve element is configured to rotate about the axis of the rotary shaft between a fully closed position where the sealing surface is in surface contact with the seat surface and a fully open position where the sealing surface is furthest away from the seat surface,
the valve element is partitioned into a first side part and a second side part with respect to a boundary defined by a virtual plane extending from the axis of the rotary shaft and parallel to an extending direction of a central axis of the valve hole,
the sealing surface includes an outermost edge which will contact with the seat surface at a position close to an outer periphery of the seat surface and an innermost edge which will contact with the seat surface at a position close to an inner periphery of the seat surface,
the valve element is configured such that, when the valve element rotates from the fully closed position in the valve opening direction, the first side part is rotated toward inside of the valve hole and the second side part is rotated toward outside of the valve hole, and the outermost edge and the innermost edge of the sealing surface are respectively rotated along rotation paths about the axis of the rotary shaft,
the seat surface is inclined toward the center of the valve hole so that an angle of the seat surface circumscribing the rotation path of the outermost edge of the sealing surface of the first side part in the fully closed position is a maximum value and an angle of the seat surface circumscribing the rotation path of the innermost edge of the sealing surface of the second side part is a minimum value, and
when a passage area for fluid to be formed between an outer periphery of the second side part of the valve element and an inner wall of the passage when the valve element rotates from the fully closed position in the valve opening direction is a first passage area, and a passage area for fluid to be formed between the second side part and the seat surface of the valve seat corresponding to the second side part when the valve element rotates from the fully closed position in the valve opening direction is a second passage area,
the passage, the valve seat, and the valve element have shapes and sizes designed so that the first passage area is 1.3 times or more as large as the second passage area over an entire rotation range of the valve element.

9. The double eccentric valve according to claim 8, wherein the valve element includes a flat bottom surface on a side facing the valve hole, and a tapered surface located between the sealing surface and the bottom surface, the tapered surface being inclined from the sealing surface toward the bottom surface.

10. The double eccentric valve according to claim 9, wherein the valve element includes a joining portion joining the innermost edge of the sealing surface to the tapered surface, and the joining portion is an outwardly protruding curved-surface.

11. The double eccentric valve according to claim 8, wherein each of the seat surface and the sealing surface has a uniform shape over an entire circumference.

12. The double eccentric valve according to claim 8, wherein
the valve element includes a fixed part protruding from a plate surface of the valve element and being fixed to the rotary shaft, the fixed part being attached to the rotary shaft in a position displaced from the axis of the rotary shaft in a radial direction of the rotary shaft, and
the fixed part is placed on the axis of the valve element, and the valve element including the fixed part has a symmetric shape with respect to the axis of the valve element.

13. The double eccentric valve according to claim 8, wherein the valve element is placed on a more upstream side in the passage than the valve seat.

14. The double eccentric valve according to claim 8, wherein
in a state where a first line extending at a shortest distance from the axis of the rotary shaft to the outermost edge of the sealing surface of the first side part intersects with the sealing surface, a first open angle γS of the sealing surface is determined by a following equation (1):

$$\gamma S = 2*\arccos((D/2-a)/CS) [\text{rad}] \quad (1)$$

where CS is a length of the first line, a is an offset amount of the rotary shaft offset from the central axis of the valve hole in the radial direction of the valve hole, and D is a largest diameter of the sealing surface, and
in a case where a second line extending at a longest distance from the axis of the rotary shaft to the innermost edge of the sealing surface of the second side part intersects with the sealing surface,
a second open angle γL of the sealing surface is determined by following equations (2) and (3):

$$\gamma L = \arcsin((f/2+t)/(CL/2)) + \arctan(f/(D/2+a)) [\text{rad}] \quad (2)$$

$$f = b - t/2 \quad (3)$$

where CL is a longest distance from the axis of the rotary shaft to the outermost edge of the sealing surface of the second side part, b is an offset amount of the rotary shaft from the center of the valve hole in a direction of the axis of the valve element, and t is a thickness of the sealing surface in an axial direction, and
an optimal open angle γ of the sealing surface is set to meet a condition of a following equation (4):

$$\gamma L \leq \gamma \leq \gamma S \quad (4).$$

* * * * *